(12) United States Patent
Frey et al.

(10) Patent No.: US 10,895,674 B2
(45) Date of Patent: Jan. 19, 2021

(54) OPTICAL FILTERING DEVICE INCLUDING FABRY-PEROT CAVITIES AND STRUCTURED LAYER BELONGING CONJOINTLY TO FIRST AND SECOND INTERFERENCE FILTERS

(71) Applicant: COMMISSARIAT A L'ENERGIE ATOMIQUE ET AUX ENERGIES ALTERNATIVES, Paris (FR)

(72) Inventors: Laurent Frey, Fontaine (FR); Bruno Mourey, Coublevie (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/732,767

(22) Filed: Jan. 2, 2020

(65) Prior Publication Data
US 2020/0142113 A1    May 7, 2020

Related U.S. Application Data

(62) Division of application No. 15/308,448, filed as application No. PCT/EP2015/059743 on May 4, 2015, now Pat. No. 10,571,612.

(30) Foreign Application Priority Data

May 6, 2014 (FR) ..................... 14 54082

(51) Int. Cl.
*G02B 5/20* (2006.01)
*G02B 5/28* (2006.01)
(Continued)

(52) U.S. Cl.
CPC ............. *G02B 5/288* (2013.01); *G02B 5/201* (2013.01); *G01B 2290/25* (2013.01); *G01J 3/26* (2013.01); *G01J 2003/2826* (2013.01)

(58) Field of Classification Search
CPC ... G01B 11/14; G01B 2290/25; G01J 3/0208; G01J 3/0229; G01J 3/0237; G01J 3/0291;
(Continued)

(56) References Cited

U.S. PATENT DOCUMENTS

| 5,726,805 A | 3/1998 | Kaushik et al. |
| 7,759,679 B2 | 7/2010 | Inaba et al. |

(Continued)

FOREIGN PATENT DOCUMENTS

| DE | 10 2011 111 883 A1 | 2/2013 |
| FR | 2 977 684 A1 | 1/2013 |

(Continued)

OTHER PUBLICATIONS

International Search Report dated Jul. 23, 2015 in PCT/EP2015/059743 (with English translation).

(Continued)

*Primary Examiner* — Ryan S Dunning
(74) *Attorney, Agent, or Firm* — Oblon, McClelland, Maier & Neustadt, L.L.P.

(57) ABSTRACT

A filtering device comprising first and second interference filters each comprising a Fabry-Perot cavity formed by semi-reflective layers between which a structured layer is arranged, wherein the structured layer belongs conjointly to the two filters, has a substantially constant thickness, is substantially planar and comprises two materials with different refractive indices arranged in each of the cavities, forming vertical structurings, the cavity of the second filter comprises a spacer arranged between one of the semi-reflective layers and the structured layer so that a distance between the semi-reflective layers of the cavity of the second filter is greater than a distance between the semi-reflective layers of the cavity of the first filter, and the filters comprise a second structured layer arranged in the cavities (Continued)

of the filters, and/or each filter comprises a second Fabry-Perot cavity comprising a third structured layer.

13 Claims, 7 Drawing Sheets

(51) Int. Cl.
*G01J 3/26* (2006.01)
*G01J 3/28* (2006.01)

(58) Field of Classification Search
CPC .......... G01J 3/26; G01J 2003/262–267; G01J 3/2823; G01J 2003/2826; G01J 2003/2879; G01J 2009/0257; G01L 9/0079; G02B 5/201; G02B 5/28–289; G02B 6/29358–29367; G02B 6/29395; G02B 26/001; G02F 2001/213; G02F 1/216; H02N 1/006
USPC ....... 356/450, 451, 454, 477, 480, 496, 505, 356/506, 519, 626; 359/577–590
See application file for complete search history.

(56) References Cited

U.S. PATENT DOCUMENTS

| | | |
|---|---|---|
| 9,741,879 B2 | 8/2017 | Frey et al. |
| 2006/0205107 A1 | 9/2006 | Inaba et al. |
| 2006/0209413 A1 | 9/2006 | Kim et al. |
| 2011/0290982 A1 | 12/2011 | Boutami et al. |
| 2012/0164399 A1 | 6/2012 | Rey et al. |
| 2012/0268809 A1 | 10/2012 | Guo et al. |
| 2013/0077029 A1 | 3/2013 | Nagato et al. |
| 2014/0034835 A1 | 2/2014 | Frey et al. |
| 2014/0217625 A1 | 8/2014 | Hazart et al. |
| 2016/0270187 A1 | 9/2016 | Robin et al. |
| 2016/0276328 A1 | 9/2016 | Robin et al. |

FOREIGN PATENT DOCUMENTS

| | | |
|---|---|---|
| JP | 2004-287191 A | 10/2004 |
| WO | WO 2013/006451 A2 | 1/2013 |

OTHER PUBLICATIONS

International Preliminary Report on Patentability dated Aug. 8, 2016 in PCT/EP2015/059743 (with English translation).
French Search Report dated Feb. 5, 2015 in French Application FR 1454082.
H. A. MacLeod, "Thin film optical filters III", Institute of Physics Publishing, 2001, pp. 260-263.
Murali Jayapala, et al., "Monolithic integration of flexible spectral filters with CMOS image sensors at wafer level for low cost hyperspectral imaging", IISW, 2013, 4 pages.
Alexander V. Tikhonravov, et al., "Application of the needle optimization technique to the design of optical coatings", Applied Optics, vol. 35, No. 28, 1996, pp. 5493-5508.

OPTICAL FILTERING DEVICE INCLUDING FABRY-PEROT CAVITIES AND STRUCTURED LAYER BELONGING CONJOINTLY TO FIRST AND SECOND INTERFERENCE FILTERS

CROSS REFERENCE TO RELATED APPLICATIONS

This application is a divisional of U.S. application Ser. No. 15/308,448, filed Nov. 2, 2016, which is a National Stage of International Application No. PCT/EP2015/059743, filed May 4, 2015, which claims priority to France Application No. 1454082, filed May 6, 2014. The entire contents of each of which are incorporated herein by reference.

TECHNICAL FIELD AND PRIOR ART

The invention relates to an optical filtering device comprising interference filters with Fabry-Perot cavities, advantageously used in the field of multispectral or hyperspectral imaging.

An image sensor conventionally comprises a matrix of filters centred on wavelengths different from one another. In a conventional colour image sensor, this matrix of filters is a Bayer matrix formed by red, green and blue filters that make it possible to reconstitute the colorimetry of the scene. These filters consist of coloured resins pixelated directly on the sensor.

In a hyperspectral camera, filters are also organised in a matrix but are present in larger numbers (typically 5 to 10 or even more), so as to detect the spectral signature of objects in a scene. The information restored by this type of camera is richer and the applications are numerous in industrial vision, or in the military or environmental field, for example for detecting gases. The filters are not produced with coloured resins, in particular because it is difficult to procure resins centred on wavelengths other than those of the red, green and blue colours, and also because the spectral responses of the resins are too broad compared with those sought for the filters of a hyperspectral camera.

A wheel with interference filters, arranged in front of the sensor, and therefore not integrated therein, is for example used in a hyperspectral camera. At each acquisition, a different filter is arranged in front of the sensor. The various acquisitions made are next combined in order to obtain the final image.

Apart from the drawback related to the non-integration of the filters with the sensor, given that various acquisitions are necessary for obtaining the filtered images according to the various spectral responses of the filters located on the wheel, this technology has limitations for real-time applications.

Wavelength filtering can be done by means of interference filters of the Fabry-Perot type, or Fabry-Perot cavity filters. The principle of such filters is for example described in the work by H. A. MacLeod, "Thin film optical filters III", Institute of Physics Publishing, London, 2001, pages 260-263. A Fabry-Perot cavity comprises two semi-reflective layers, or semi-reflective mirrors, arranged facing each other and between which there is a medium with a refractive index, or optical index, n, for example a layer with a refractive index n. The incident light is reflected by the filter for all the wavelengths, except for a discrete set of wavelengths that are transmitted outside the filter. For these transmitted wavelengths, the optical path travelled by the light in an outward and return travel in the Fabry-Perot cavity is a multiple of $2\pi$. In normal incidence, these wavelengths, or centre wavelengths of the spectral responses of the filters, are therefore a function of the refractive index n and of a thickness d of the layer of material arranged between the two semi-reflective layers. The centre wavelengths $\lambda_m$, at the various orders m of the Fabry-Perot cavity are defined by the following equation:

$$\lambda_m = \frac{2nd}{m + \frac{(\Phi_a + \Phi_b)}{2\pi}} \quad (1)$$

with m being the order of the Fabry-Perot cavity in question, and $\Phi_a$ and $\Phi_b$ being the phase differences occurring in the cavity during reflections on the semi-reflective layers.

The documents WO 2013/064511 A1 and "Monolithic integration of flexible spectral filters with CMOS image sensors at wafer level for low cost hyperspectral imaging" by M. Jayapala et al., IISW2013, describe filters with Fabry-Perot cavities wherein the tunability for wavelength is achieved by varying the thickness of the cavity of each of the filters. This is a so-called "staircase" filter technology. Sixteen to thirty-two filters are thus produced in a sensor suitable for the range 600 nm-1000 nm, thus covering a small part of the visible range and the near infrared range. The layers of material arranged between the semi-reflective layers comprise amorphous silicon or $SiO_2$. The semi-reflective layers consist of stacks of alternate layers of amorphous silicon and $SiO_2$ common to all the filters. The lower part of the visible range, that is to say the wavelengths between approximately 400 nm and 600 nm, is inaccessible to these filters because of the coefficient of absorption of amorphous silicon, which is too great at these wavelengths. The integration of the filters is monolithic, that is made directly on the sensor by deposition and etching steps following the back-end steps of the sensor.

This type of filtering device has two drawbacks:
- the number of etching steps to be carried out increases with the number of filters required, whatever the production method envisaged for this staircase structure;
- the most economical production method in terms of number of etching steps (N etching steps for $2^N$ filters) consists of carrying out successive partial etchings in the same layer. However, in a batch manufacturing method (to the wafer scale), the deposition and partial etching steps are always affected by a certain degree of non-uniformity over the surface of the wafer, the diameter of which is 200 mm or 300 mm. The centre wavelength of the spectral responses of the filters is very sensitive to the thickness of the cavity. The document WO 2013/064511 A1 states that control of the thickness of ±2% is essential. This type of filtering device is therefore not ideal for industrial production requiring batch manufacture of the filters, in particular since the errors caused by the successive etching steps may be cumulative.

The document U.S. Pat. No. 7,759,679B2 describes a filtering device in which the tunability of the filters for wavelength is achieved by varying the effective refractive index of the medium located between the two semi-reflective layers of the cavity, the thickness of this medium being constant in all the filters. For this purpose, nanostructures are etched in a layer comprising a first dielectric material. The etched zones are filled with a second dielectric material, the refractive index of which is for example less than that of the first dielectric material, and a chemical mechanical polishing (CMP) is carried out in order to smooth the layer comprising the nanostructures. The light passing through these nanostructures sees a mean refractive index, or effective refractive index, the value of which is between those of the refractive indices of the two dielectric materials since the lateral dimensions of the nanostructures are smaller than the wavelengths intended to be transmitted by the filter. Using a single mask, it is possible to vary the dimensions of these nanostructures in the plane of the layer and therefore to vary the effective refractive index along this structured layer in a range lying between the refractive index of the second dielectric material and the refractive index of the first dielectric material. All the filters required in the structured layer can therefore be achieved with the implementation of a single lithography and etching step. The method for producing this filtering device does not comprise partial etching and therefore does not have the drawbacks related to the production of "staircase" filters.

However, the spectral range accessible for such a filtering device is limited by the difference between the refractive indices of the materials used for producing the structured layer. However, in the visible and near infrared ranges, there do not exist very great differences in index between the various known materials that can be used. Thus, for the first order of the Fabry-Perot cavities, it is possible to tune these filters between 450 nm and 680 nm only, using $SiO_2$ (refractive index equal to 1.47) as the low-index material and making it possible to produce a filter the spectral response of which is centred at 450 nm when this filter comprises only $SiO_2$, and $TiO_2$ (refractive index equal to 2.25) as a high-index material and making it possible to produce a filter the spectral response of which is centred at 680 nm when this filter comprises only $TiO_2$. Such a filter device therefore does not make it possible to achieve multispectral filtering over all the visible and near infrared ranges simultaneously.

The document US 2011/0290982 A1 describes a filtering device in which the same structure principle is used for tuning the filters by the effective refractive index of the layer of materials located between the semi-reflective layers. Better selectivity, and in particular better rejection of the filters, is obtained by means of the use of two Fabry-Perot cavities placed one on top of the other for each of the filters. To facilitate the production of the patterns in the case where the nanostructures are small compared with the accessible resolution in lithography, it is proposed in this document to produce, in place of very fine patterns with etching throughout the thickness of the structured layer, patterns that are wider but over a smaller depth so as to obtain the same effective index. The volume proportions of the two materials are in these cases the same as for etching throughout the entire thickness of the material for very fine patterns. The physical thickness of the cavity, defined by the distance between the semi-reflective layers corresponding to metal layers, also remains constant.

As with the document U.S. Pat. No. 7,759,679B2, the spectral range accessible with this type of device is limited by the difference in index between the two dielectric materials used. In addition, when nanostructures are produced through only part of the thickness of the layer, it is necessary, to achieve the same wavelength ranges, to produce two layers nanostructured one on the other, inside each of the Fabry-Perot cavities. This increases the complexity and cost of producing the filtering device since each nanostructured layer requires a high-resolution lithography step. Moreover, etching the second nanostructured layer may, by over-etching, degrade the first nanostructured layer with such a method.

DISCLOSURE OF THE INVENTION

One aim of the present invention is to propose an optical filtering device solving at least some of the problems of the filtering devices of the prior art disclosed above.

For this purpose, the present invention proposes an optical filtering device comprising at least first and second interference filters each comprising at least one first Fabry-Perot cavity formed by first and second semi-reflective layers between which at least one first structured layer is arranged, in which:

the first structured layer belongs conjointly to the first and second interference filters, has a substantially constant thickness, is substantially planar and comprises first portions of at least two dielectric or semiconductor materials, with different refractive indices, arranged, in each of the first Fabry-Perot cavities and in a plane parallel to the first semi-reflective layer, alongside one another in alternation;

the first Fabry-Perot cavity of the second interference filter comprises at least one first spacer arranged between one of the first and second semi-reflective layers and the first structured layer in such a way that a distance between the first and second semi-reflective layers of the first Fabry-Perot cavity of the second interference filter is greater than a distance between the first and second semi-reflective layers of the first Fabry-Perot cavity of the first interference filter;

and in which the first and second interference filters are produced according to a first configuration and/or a second configuration such that:

according to the first configuration, the device further comprises a second structured layer arranged between the first and second semi-reflective layers, belonging conjointly to the first and second interference filters, having a substantially constant thickness, being substantially planar and comprising second portions of the two materials with different refractive indices arranged, in each of the first Fabry-Perot cavities and in the plane parallel to the first semi-reflective layer, alongside one another in alternation;

according to the second configuration, the first and second interference filters each comprise at least one second Fabry-Perot cavity arranged on top of the first Fabry-Perot cavity and formed by the first and a third semi-reflective layer between which at least one third structured layer is arranged, the third structured layer belonging conjointly to the first and second interference filters, having a substantially constant thickness, being substantially planar and comprising third portions of the two materials with different refractive indices arranged, in each of the second Fabry-Perot cavities and in the plane parallel to the first semi-reflective layer, alongside one another in alternation, the second Fabry-Perot cavity of the second interference filter further comprising at least one second spacer arranged between the third semi-reflective layer and the third structured layer so that a distance between the first and third semi-reflective layers of the second Fabry-Perot cavity of the second interference filter is greater than a distance between the first and third semi-reflective layers of the second Fabry-Perot cavity of the first interference filter.

An optical filtering device is also described, comprising at least first and second interference filters each comprising at least one first Fabry-Perot cavity formed by first and second semi-reflective layers between which at least one first structured layer is arranged, in which:

the first structured layer is common to the first and second interference filters, the first structured layer has a substantially constant thickness, the first structured layer comprises at least two materials with different refractive indices included in each of the first Fabry-Perot cavities, and the first Fabry-Perot cavity of the second interference filter comprises at least one first spacer arranged between one of the first and second semi-reflective layers and the first structured layer so that a distance between the first and second semi-reflective layers of the first Fabry-Perot cavity of the second interference filter is greater than a distance between the first and second semi-reflective layers of the first Fabry-Perot cavity of the first interference filter.

The expression "structured layer" designates the fact that the layer comprises portions of the two materials with different refractive indices that form structurings, or patterns, in the layer. In such a structured layer, portions of the first of the two materials and portions of the second of the two materials are arranged, in a plane parallel to the main faces of this layer (a plane that is also perpendicular to the direction of stacking of the layers of the device), alongside one another in alternation, that is to say so that a portion of the first of the two materials is arranged between at least two portions of the second of the two materials and so that a portion of the second of the two materials is arranged between at least two portions of the first of the two materials. Such structurings do not constitute roughnesses or a superimposition of layers of these two materials. Such structurings can be seen as transverse, or vertical, structures arranged alongside one another in the plane parallel to the main faces of the structured layer.

Such an optical filtering device therefore proposes the production of a plurality of interference filters with Fabry-Perot cavities the centre wavelengths of which are defined by a plurality of parameters related to the structured layer (the values of the refractive indices of the two materials used, the parameters, such as the form and dimensions, of the patterns formed by the two materials, the thickness of the structured layer) but also, for the second interference filter or filters, by a plurality of parameters related to the spacer present in the Fabry-Perot cavity or cavities of the second interference filter or filters (the refractive index of the material of the spacer, its thickness, etc.).

Thus, compared with the filtering devices of the prior art having only one structured layer with a constant thickness, the optical filtering device according to the invention is suitable for carrying out filtering in a more extensive range of wavelengths, which may cover for example the visible range and the near infrared, and in particular which is not limited by the nature of the materials used for producing the structured layer, by virtue of the presence of the spacer in the second interference filter or filters.

Compared with a staircase optical filtering device, the optical filtering device according to the invention may be produced with a much lower number of etching steps, without having recourse to partial etching steps. The optical filtering device according to the invention is therefore well suited to collective manufacture of staircase filters to the substrate, or wafer, scale without errors caused by successive partial etching steps.

The optical filtering device according to the invention also comprises a structure suitable for integration on a sensor, for example an image sensor of the CMOS type, allowing real-time capture throughout the range of spectral responses of the interference filters of the optical filtering device.

Each of the interference filters can transmit a single spectral band (each interference filter therefore being of the band-pass type), for example in the complete visible and near-infrared range, thus facilitating processing of the image captured via a sensor provided with such an optical filtering device.

The optical filtering device may cover solely the visible range, for example when the materials that can be used for forming the structured layer have refractive indices with similar values. In another configuration, the optical filtering device may cover at least part of the visible range and/or at least part of the infrared range (near infrared and/or mid-infrared and/or far infrared) and/or at least part of the UV range. The second interference filter or filters may in particular carry out filtering in the infrared range, the first interference filter or filters being able to be dedicated to the visible and/or UV range.

The Fabry-Perot cavities may be arranged on a transparent substrate, for example comprising glass. Such a transparent substrate may allow integration of the optical filtering device on a sensor, for example by transfer onto a silicon substrate.

The optical filtering device may comprise only one structured layer common to the first Fabry-Perot cavities in all the interference filters of the device and arranged inside the first Fabry-Perot cavities. Such a configuration is advantageous since the use of only one structured layer per Fabry-Perot cavity simplifies and reduces the cost of the production compared with Fabry-Perot cavities comprising a plurality of superimposed structured layers, and also avoids any degradation of the bottom structured layer when the top structured layer is produced. In addition, the presence of the spacer in the second interference filter or filters enables the optical filtering device to cover a spectral range at least as extensive as the one covered by a filtering device not comprising a spacer but using one or more superimposed structured layers.

The device according to the invention judiciously combines a plurality of structured layers with one or more spacers within the same interference filter.

When the device is produced according to the first configuration, that is to say when two distinct structured layers are used within the same Fabry-Perot cavity, this facilitates production of the device, in particular the lithography steps that have to be used for producing the structured layers, compared with a device that would comprise interference filters carrying out similar filtering but which would comprise only one structured layer. This is because, by distributing the structurings in two superimposed structured layers, the constraints in producing these structurings are lower than when the structurings have to be produced in a single structured layer, for a given range of spectra. In addition, this superimposition of structured layers makes it possible to produce, for a given occupation surface, a larger number of interference filters, and therefore makes it possible to obtain a larger number of transmission peaks in the filtering spectrum of the device.

When the device is produced according to the second configuration, that is to say when two superimposed Fabry- Perot cavities are used to form an interference filter, the levels of the transmission peaks of the filtering spectrum of the device are more homogeneous with respect to one another, compared with a filtering device using only one Fabry-Perot cavity per interference filter. This second configuration does not constitute a simple superimposition of a plurality of Fabry-Perot cavities. This is because, in this second configuration, the second spacer present in the second cavity of the second filter is judiciously arranged under the third structured layer and is arranged so that it forms a planar surface with the elements around it so that the third structured layer can be produced on this planar surface. The planeness of the third structured layer is also obtained, for the semi-reflective layer common to the two superimposed cavities and therefore makes it possible then to produce the first cavity above the second cavity, there also starting from a planar surface for producing the first structured layer.

The spacer may be arranged on or under the structured layer.

The first structured layer is advantageously continuous from one Fabry-Perot cavity to another. In other words, the main faces of the parts of the structured layer arranged in the various cavities are arranged in two planes only.

The spectral responses of the interference filters may cover a large substantially continuous spectral band (each interference filter being able to form a band-pass filter passing a range of wavelengths adjacent to a range of wavelengths that another adjacent filter passes) or a plurality of distinct and not necessarily adjacent spectral bands.

The two materials with different refractive indices may be dielectric and/or semiconductor materials. This makes it possible to obtain better spectral selectivity compared with the filtering devices using plasmons via the use of metal layers. Likewise, the first spacer may comprise at least one dielectric or semiconductor material.

The first structured layer may comprise periodic patterns formed by portions of a second of the two materials with different refractive indices arranged in a first of the two materials with different refractive indices.

The first structured layer and/or the second structured layer and/or the third structured layer may comprise periodic patterns formed respectively by the first and/or second and/or third portions of a second of the two materials with different refractive indices arranged in a layer of a first of the two materials with different refractive indices formed respectively from the first and/or second and/or third portions of the first of the two materials with different refractive indices.

In each of the first and/or second Fabry-Perot cavities, values of dimensions (dimensions in a main plane of the structured layer) and of a period of the periodic patterns may be less than a value of a centre wavelength of the spectral response respectively of said first and/or second first-order 1 Fabry-Perot cavity.

The periodic patterns may form, in a main plane of the first structured layer, bidimensional structures, for example pads with a rectangular or square shape. The periodic patterns are in this case well suited to carrying out filtering of a non-polarised light or of a light comprising two polarisations.

In a variant, the periodic patterns may form, in the main plane of the first structured layer, unidimensional structures, for example slots extending in only one direction. The periodic patterns are in this case well suited to carrying out filtering of a light comprising a single polarisation.

Advantageously, the first and/or second and/or third portions of the second of the two materials with different refractive indices may be formed throughout the thickness respectively of the first structured layer and/or of the second structured layer and/or of the third structured layer.

It is however possible for the portions of the second of the two materials with different refractive indices to be formed in only part of the thickness of the first structured layer. The same applies to the second and third structured layers. In this case, the presence of the spacer in the second interference filter or filters makes it possible to cover a large spectral band without necessarily having to use two structured layers superimposed in Fabry-Perot cavities.

The optical filtering device may further comprise at least one first etching stop layer arranged at least between one of the first and second semi-reflective layers and the first structured layer of the first Fabry-Perot cavity of the first interference filter. This etching stop layer may in particular protect the structured layer when the spacer is produced, which may involve a step of etching material present on the first interference filter or filters. This etching stop layer may have high etching selectivity compared with that of the material forming the spacer. A single etching stop layer may be sufficient to guarantee the integrity of the structured layer common to all the filters. It is possible for this etching stop layer to be present also at the second interference filter or filters, which simplifies the production of this etching stop layer without causing disturbance in the filterings carried out.

The first interference filter and/or the second interference filter may comprise at least one second Fabry-Perot cavity superimposed on the first Fabry-Perot cavity. Compared with an interference filter comprising only one Fabry-Perot cavity, the superimposition of two Fabry-Perot cavities, advantageously identical with respect to each other, makes it possible to obtain better rejection of the filter and a spectral response where the flanks have a greater slope, and therefore a more precise range of wavelengths transmitted. Furthermore, this configuration makes it possible to have greater uniformity, in terms of maximum transmission, of the spectral responses of the interference filters over the entire range of wavelengths sought.

In this configuration, one of the two semi-reflective layers of the first Fabry-Perot cavity may also form one of the two semi-reflective layers of the second Fabry-Perot cavity.

When the second interference filter comprises a second Fabry-Perot cavity, said second Fabry-Perot cavity may comprise at least one second spacer arranged between a third semi-reflective layer and a second structured layer of said second Fabry-Perot cavity.

The second spacer may comprise at least one dielectric or semiconductor material.

The first spacer and the first etching stop layer may be arranged between the first structured layer and the second semi-reflective layer, and:
  according to the first configuration, a second etching stop layer may be arranged between the first and second structured layers;
  according to the second configuration, a third etching stop layer may be arranged between the third structured layer and the third semi-reflective layer.

The optical filtering device may further comprise at least one portion of material absorbent vis-à-vis wavelengths with values lower than that of a centre wavelength of a spectral response of the first Fabry-Perot cavity of the second interference filter, for example amorphous or polycrystalline silicon, arranged on or in the first Fabry-Perot cavity of the second interference filter. This portion of material in this case makes it possible to absorb some wavelengths transmitted at order 2 (or at the orders above 2) of the Fabry-Perot cavity of the second interference filter.

The first spacer and/or the second spacer may comprise amorphous or polycrystalline silicon, which enables them also to fulfil the role of absorbent material as described above.

The optical filtering device may comprise a plurality of first interference filters arranged alongside one another and in which proportions by volume of the two materials with different refractive indices with respect to each other in the first structured layer and/or the second structured layer and/or the third structured layer may be different from one first interference filter to the other, and/or may comprise a plurality of second interference filters arranged alongside one another and in which proportions by volume of the two materials with different refractive indices with respect to each other in the first structured layer and/or the second structured layer and/or the third structured layer may be different from one second interference filter to the other.

The proportions by volume of the two materials with refractive indices different with respect to each other in the second interference filter or filters may be different from the proportions by volume of the two materials with refractive indices different with respect to each other in the first interference filter or filters.

It is for example possible to have a plurality of first interference filters suitable for carrying out filtering in the visible range, and one or more second interference filters suitable for carrying out filtering in the infrared range. It is possible to produce at least one first interference filter suitable for carrying out filtering in the visible range and at least one second interference filter suitable for carrying out filtering in the infrared range, in which the proportions by volume of the two materials with different refractive indices with respect to each other are similar in the first and second interference filters, the spacer or spacers solely present in the second filter making it possible to centre the second filter on a wavelength different from that on which the first filter is centred.

The optical filtering device may comprise a total number of interference filters of between 5 and 15, or between 5 and 10. Such an optical filtering device may be integrated in a hyperspectral camera.

The interference filters of the optical filtering device may form a matrix of interference filters.

Each semi-reflective layer may comprise at least one metal material.

The invention also relates to an image sensor comprising at least one optical filtering device as defined previously, in which each of the first and second interference filters of the optical filtering device is arranged at one or more adjacent pixels of the image sensor.

The invention also relates to a method for producing an optical filtering device comprising at least first and second interference filters each comprising at least one first Fabry-Perot cavity, comprising at least the following steps:

producing a first semi-reflective layer of the first Fabry-Perot cavities;

producing, on the first semi-reflective layer, a first structured layer belonging conjointly to the first and second interference filters, having a substantially constant thickness, being substantially planar and comprising first portions of at least two dielectric or semi-conductive materials, with different refractive indices, intended to be arranged, in each of the first Fabry-Perot cavities and in a plane parallel to the first semi-reflective layer, alongside one another in alternation;

producing at least one first spacer at a region of the first structured layer intended to form part of the first Fabry-Perot cavity of the second interference filter;

producing a second semi-reflective layer of the first Fabry-Perot cavities;

a distance between the first and second semi-reflective layers of the first Fabry-Perot cavity of the second interference filter being greater than a distance between the first and second semi-reflective layers of the first Fabry-Perot cavity of the first interference filter, and in which the first and second interference filters are produced according to a first configuration and/or a second configuration such that:

according to the first configuration, the method further comprises, between the production of the first structured layer and the production of the first spacer, the production of a second structured layer intended to be arranged between the first and second semi-reflective layers, belonging conjointly to the first and second interference filters, having a substantially constant thickness, being substantially planar and comprising second portions of the two materials with different refractive indices arranged, in each of the first Fabry-Perot cavities and in the plane parallel to the first semi-reflective layer, alongside one another in alternation;

according to the second configuration, the method further comprises, before the first semi-reflective layer is produced, the production of at least one second Fabry-Perot cavity of each of the first and second interference filters, superimposed on the first Fabry-Perot cavity and formed by the first and third semi-reflective layers between which at least one third structured layer is produced, the third structured layer belonging conjointly to the first and second inference filters, having a substantially constant thickness, being substantially planar and comprising third portions of the two materials with different refractive indices arranged, in each of the second Fabry-Perot cavities and in the plane parallel to the first semi-reflective layer, alongside one another in alternation, the second Fabry-Perot cavity of the second interference filter further comprising at least one second spacer arranged between the third semi-reflective layer and the third structured layer so that a distance between the first and third semi-reflective layers of the second Fabry-Perot cavity of the second interference filter is greater than a distance between the first and third semi-reflective layers of the second Fabry-Perot cavity of the first interference filter.

A method for producing an optical filtering device is also described, comprising at least first and second interference filters each comprising at least one first Fabry-Perot cavity, comprising at least the following steps:

producing a first semi-reflective layer of the first Fabry-Perot cavities;

producing, on the first semi-reflective layer, a first structured layer comprising at least two materials with different refractive indices intended to be included in each of the first Fabry-Perot cavities, the first structured layer being common to the first and second interference filters and having a substantially constant thickness;

producing at least a first spacer at a region of the first structured layer intended to form part of the first Fabry-Perot cavity of the second interference filter;

producing a second semi-reflective layer of the first Fabry-Perot cavities;

a distance between the first and second semi-reflective layers of the first Fabry-Perot cavity of the second interference filter being greater than a distance between the first and second semi-reflective layers of the first Fabry-Perot cavity of the first interference filter.

This method makes it possible to simultaneously produce a plurality of multilayer interference filters with Fabry-Perot cavities, for example arranged in a matrix, the resonance wavelengths of which cover a spectral range not limited by the indices of the materials used. This method has the advantage of comprising few tricky steps, and the total number of steps used remains low. This method may comprise only two lithography steps, including one at high definition (for producing the structured layer), for producing at least two filters the spectral responses of which may be distributed in the complete visible and near infrared range. Simply by modifying the mask used for the lithography of the layer to be structured, this method makes it possible to produce more filters positioned at intermediate wavelengths, for example more than 11 interference filters.

This method may comprise steps implemented in thin-layer technology.

The production of the first structured layer may comprise the implementation of the following steps:
  deposition, on the first semi-reflective layer, of a layer of a first of the two materials with different refractive indices;
  lithography and etching of hollows in the layer of the first of the two materials with different refractive indices, forming the first portions of the first of the two materials with different refractive indices;
  deposition of a layer of a second of the two materials with different refractive indices in the hollows and on the layer of the first of the two materials with different refractive indices;
  planarisation of the layer of the second of the two materials with different refractive indices with stoppage on the layer of the first of the two materials with different refractive indices, forming the first portions of the second of the two materials with different refractive indices.

The production of the first spacer may comprise the implementation of the following steps:
  deposition of a first etching stop layer on the first structured layer or, when the first and second interference filters are produced according to the first configuration, on the second structured layer;
  deposition, on the first etching stop layer, of a layer of material intended to form the first spacer;
  lithography and etching of the layer of material intended to form the first spacer so that a remaining portion of said layer of material forms the first spacer.

The method may further comprise, prior to the production of the first semi-reflective layer, the production of second Fabry-Perot cavities superimposed on the first Fabry-Perot cavities.

In this case, when the first and second interference filters are produced according to the second configuration, the production of the second Fabry-Perot cavities may comprise the implementation of the following steps:
  producing, at a first region of a substrate on which the first interference filter is intended to be produced, a relief, the thickness of which is substantially equal to that of the second spacer intended to be produced;
  depositing the third semi-reflective layer on the relief and on a second region of the substrate on which the second interference filter is intended to be produced;
  producing the second spacer on a part of the third semi-reflective layer intended to form part of the second Fabry-Perot cavity of the second interference filter, the second spacer and a part of the third semi-reflective layer intended to form part of the second Fabry-Perot cavity of the first interference filter forming a planar top surface;
  producing, on said planar top surface, the third structured layer;
  and in which the first semi-reflective layer may next be produced on the third structured layer.

When the first and second interference filters are produced according to the first configuration, the production of the second structured layer may comprise the implementation of the following steps:
  deposition of a second etching stop layer on the first structured layer;
  deposition, on the second etching stop layer, of a layer of a first of the two materials with different refractive indices;
  lithography and etching of hollows in the layer of the first of the two materials with different refractive indices, forming the second portions of the first of the two materials with different refractive indices;
  deposition of a layer of the second of the two materials with different refractive indices in the hollows and on the layer of the first of the two materials with different refractive indices;
  planarisation of the layer of the second of the two materials with different refractive indices with a stoppage on the layer of the first of the two materials with different refractive indices, forming the second portions of the second of the two materials with different refractive indices.

BRIEF DESCRIPTION OF THE DRAWINGS

The present invention will be understood better from a reading of the description of example embodiments given purely by way of indication and in no way limitatively with reference to the accompanying drawings, in which.

Identical, similar or equivalent parts of the various figures described below bear the same numerical references so as to facilitate passage from one figure to another.

Various parts shown in the figures are not necessarily shown to a uniform scale, in order to make the figures more legible.

The various possibilities (variants and embodiments) must be understood as not being exclusive of one another and may be combined with one another.

DETAILED DISCLOSURE OF PARTICULAR EMBODIMENTS

Figure 1:
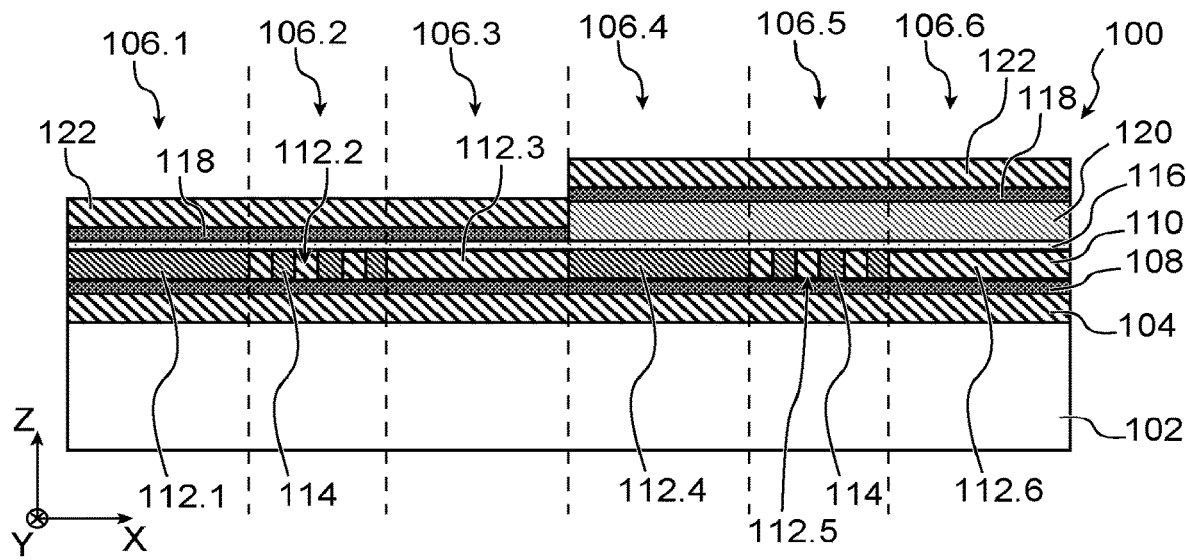
FIGS. 1 and 2 show schematically an optical filtering device according to first and second example embodiments.

Reference is made first of all to FIG. 1, which shows an optical filtering device 100 according to a first example embodiment.

The device 100 comprises a transparent substrate 102, comprising for example glass. A first anti-reflective layer 104 is arranged on the substrate 102. The first anti-reflective layer 104 comprises for example a dielectric material such as SiN. Its thickness is for example approximately 50 nm, or more generally between approximately 10 nm and 70 nm. The thickness of the layer 104 depends on the spectral range sought by the device 100 and the refractive index of the layer 104. Different values, and in particular higher ones than those indicated above, may be envisaged since the anti-reflective effect is periodic with the thickness of the layer 104. The layer 104 may be produced in the form of a thin layer. A plurality of layers transparent to the required wavelengths of the filters of the device 100, and with different refractive indices, may be arranged on the substrate 102, stacked one on top of the other, such a multilayer being able to form an anti-reflective element more effective than a single anti-reflective layer. In a variant, the device 100 may not comprise any anti-reflective layer.

Interference filters 106 with Fabry-Perot cavities (six filters referenced 106.1-106.6 in FIG. 1) are arranged on the first anti-reflective layer 104. The six filters 106.1-106.6 are such that the centre wavelengths of the spectral responses of these filters are different with respect to one another and are called respectively $\lambda_{106.1}$-$\lambda_{106.6}$. In general terms, the device 100 may comprise at least two interference filters 106, and advantageously between 5 and 15 filters 106, or between 5 and 10 filters 106, or even an even larger number of filters 106. The number of filters 106 that the device 100 has depends on the number of distinct spectral responses required in the spectral range that is to be processed by the device 100. Although in FIG. 1 the filters 106 are arranged alongside one another along the axis y, the filters 106 of the device 100 are generally arranged in the form of a matrix of filters.

These filters 106 comprise a first semi-reflective layer 108, or semi-reflective mirror, which is here common to all the filters 106. The first semi-reflective layer 108 is a metal layer, comprising for example silver, and the thickness of which is for example approximately 44 nm or more generally between approximately 30 nm and 60 nm. The first anti-reflective layer 104 arranged between the substrate 102 and the first semi-reflective layer 108 prevents or limits light reflections on the first semi-reflective layer 108.

The filters 106 also comprise a structured layer 110 forming part of the environment of the filters 106 located between the semi-reflective layers of the filters 106. This structured layer 110 is common to all the filters 106 and has a thickness $e_N$ that is substantially constant for all the filters 106. The structured layer 110 comprises at least two materials with different refractive indices $n_B$ and $n_H$, here dielectric materials corresponding to SiN (index $n_H$) and SiO$_2$ (index $n_B$), these two materials being structured so that the various regions of the structured layer 110 present in the various filters 106 comprise various proportions by volume of these two materials so that the actual refractive index of the structured layer 110 varies from one filter to another. The material with the larger refractive index $n_H$ is referred to as the first material, and is here SiN, and the one with the smaller refractive index $n_B$ is referred to as the second material, and is here SiO$_2$. The materials of the structured layer 110 are transparent at least vis-à-vis wavelengths intended to be transmitted by the filters 106. In a variant, at least one of the first and second materials may be a semiconductor material.

In the example in FIG. 1, a region 112.1 of the structured layer 110 forming part of the filter 106.1 comprises only the second material. A region 112.2 of the structured layer 110 forming part of the filter 106.2 comprises the first material, in which the hollows 114 are produced throughout the thickness of the structured layer 110 and are filled by portions of the second material, thus forming structurings of the structured layer 110. In the example described here, these hollows 114, and therefore the portions of the second material, each have a cross section, in a main plane of the structured layer 110, that is to say a plane parallel to the face of the structured layer 110 located against the first semi-reflective layer 108 (parallel to the plane (X,Y) in FIG. 1), with a rectangular or square shape. The period of the structuring is less than the value of the centre wavelength of the spectral response of the filter 106.2. The structurings of the structured layer 110 may have forms other than rectangular or square, for example groove or trench shapes produced over the entire length or the entire width of the filter. A region 112.3 of the structured layer 110 forming part of the filter 106.3 comprises only the first material. The filters 106.4, 106.5 and 106.6 each comprise a region 112.4, 112.5 and 112.6 of the structured layer 110 that are here similar to the regions 112.1, 112.2 and 112.3 respectively.

An etching stop layer 116 is arranged on the structured layer 110. This etching stop layer 116 comprises a material which can be etched much more slowly than the materials of the spacer 120 described below, for example AlN or TiO$_2$, and which is transparent vis-à-vis the wavelengths intended to be transmitted by the filters 106. The thickness of the etching stop layer 116 is for example between approximately 5 nm and 10 nm. This etching stop layer 116 is present in the filtering device 100 because of the production method used and which is described below in relation to FIGS. 5 to 10.

For the filters 106.1 to 106.3, the transparent materials located between the semi-reflective layers of these filters correspond to the materials of the regions 112.1 to 112.3 of the structured layer 110 and to the material of the etching stop layer 116. Thus, at these filters 106.1 to 106.3, a second semi-reflective layer 118 is arranged directly on the etching stop layer 116. Thus the incident light at the filters 106.1 to 106.3 is reflected between the semi-reflective layers 108 and 118 in the structured layer 110 and the etching stop layer 116. The height, or thickness, of the Fabry-Perot cavities of the filters 106.1 to 106.3 formed between the two semi-reflective layers 108 and 118 is equal to the sum of the thickness $e_N$ of the structured layer 110 and the thickness of the etching stop layer 116.

For the filters 106.4 to 106.6, the second semi-reflective layer 118 is arranged not directly on the etching stop layer 116 but on a spacer 120 corresponding here to a portion of dielectric material with refractive index $n_S$ and thickness $e_S$, arranged between the etching stop layer 116 and the second semi-reflective layer 118. The height, or thickness, of the Fabry-Perot cavities of the filters 106.4 to 106.6 formed between the two semi-reflective layers 108 and 118 is therefore different from the height of the filters 106.1 to 106.3 because of the presence of the spacer 120, thus modifying the values of the centre wavelengths $\lambda_{106.4}$ to $\lambda_{106.6}$ of the spectral responses of these filters compared with those of the centre wavelengths $\lambda_{106.1}$ to $\lambda_{106.3}$ of the spectral responses of the filters 106.1 to 106.3. This thickness is equal to the sum of the thickness $e_N$ of the structured layer 110, the thickness of the etching stop layer 116 and the thickness $e_S$ of the spacer 120. The material of the spacer 120 corresponds for example to one of the materials of the structured layer, advantageously the one with the lowest index $n_B$, or to any other dielectric or semiconductor material. The spacer 120 comprises a material that is transparent vis-à-vis the wavelengths intended to be transmitted by the filters 106.4 to 106.6. In the example in FIG. 1, the spacer 120 comprises $SiO_2$. The incident light to the filters 106.4 to 106.6 is reflected between the semi-reflective layers 108 and 118 in the structured layer 110, the etching stop layer 116 and the spacer 120.

In general terms, the device 100 comprises at least one filter, the height, or thickness, of which is different from one or more other filters of the device 100 because of the presence of a spacer 120 in this filter.

A second anti-reflective layer 122 is arranged on the second semi-reflective layer 118 in all the filters 106, and prevents or limits light reflections on the second semi-reflective layer 118. This second anti-reflective layer 122 has for example a thickness similar to that of the layer 104. A plurality of second anti-reflective layers 122 may be arranged on the second semi-reflective layer 118.

Thus the centre wavelengths of the spectral responses of the filters 106 of the device 100 are defined both by the thickness of the Fabry-Perot cavities of the filters 106 that differ in the device 100, and by the effective index of the medium between the semi-reflective layers, which changes from one filter to another within the device 100 by virtue of the structured layer 110.

The thickness $e_N$ of the structured layer 110 is defined according to the previously described equation (1) (the stop layer 116 has little influence on the filtering which is carried out and, for the calculations carried out using equation (1), it may be considered, as a first approximation, to be absent from the filters 106). Thus this thickness $e_N$ may be chosen by considering the characteristics of the first filter 106.1 the wavelength $\lambda_{106.1}$ of which has the smallest value among those of the centre wavelengths of the spectral responses of the filters 106 of the filtering device 100, that is to say according to the values of $\lambda_{106.1}$ and of the index $n_B$ of the second material, which is the only one present in the region 112.1 of the structured layer 110 of the first filter 106.1. The wavelength $\lambda_{106.3}$, that is to say the longest centre wavelength of the spectral responses among the filters that do not comprise the spacer 120, depends on the thickness $e_N$ and the index $n_H$ of the first material, which is the only one present in the region 112.3 of the structured layer 110 of the filter 106.3. For the filters that do not comprise the spacer 120 and which comprise regions of the structured layer 100 comprising the structuring formed by the first and second materials (the filter 106.2 in the example in FIG. 1), the dimensions of the structurings, corresponding to the dimensions of the hollows 114, can be calculated as described in the document US 2011/0290982 A1.

The value of the thickness $e_S$ of the space 120 is chosen by considering the characteristics of the filter 106.4 the wavelength $\lambda_{106.4}$ of which has the smallest value among those of the centre wavelengths of the spectral responses of the filters that comprise the spacer 120, that is to say according to values of $\lambda_{106.4}$ and of the index $n_B$ of the second material, which is the only one present in the region 112.4 of the structured layer 110 of the filter 106.4, and also according to the refractive index $n_S$ of the material of the spacer 120. The previously described equation (1) can be used for calculating this thickness $e_S$, the numerator of this equation corresponding to the sum of the optical paths in each of the layers 110 and 120, that is to say $2n_S e_S + 2n_B e_N$ (as before, for reasons of simplification of the calculations carried using equation (1), the etching stop layer 116 is considered, as a first approximation, to be absent from the filters 106 because of the small impact of this layer on the filterings carried out). The value of the wavelength $\lambda_{106.6}$, that is to say the longest centre wavelength of the spectral responses among the filters that comprise the spacer 120, depends on the thicknesses $e_N$ and $e_S$ and of the index $n_H$ of the first material, which is the only one present in the region 112.6 of the structured layer 110 of the filter 106.6 (the optical paths in question are optical paths in each of the layers 110 and 120, that is to say $2n_S e_S + 2n_H e_N$). For the filters that comprise the spacer 120 and which comprise regions of the structured layer 100 comprising structurings (the filter 106.5 in the example in FIG. 1), the dimensions of the structurings can be calculated as described in the document US 2011/0290982 A1. These dimensions are generally greater than the centre wavelength of the spectral response of the filter comprising the structurings.

The design of the device 100 may be such that $\lambda_{106.3} = \lambda_{106.4}$ so that the spectral ranges covered by the two groups of filters (first group of filters 106.1-106.3 that do not comprise the spacer 120 and the second group of filters 106.4-106.6 that comprise the spacer 120) are contiguous and result in a single spectral range covering a wide spectrum. It is however possible that this is not the case.

The changes to the spectral responses caused by the Fresnel reflection at the interface between the structured layer 110 and the spacer 120, and by the etching stop layer 116 in the cavities of the filters 106, are in general not significant and can be minimised or optimised judiciously by conventional methods of simulating multilayer stacks having recourse to software using multilayer optimisation algorithms based on the Abeles formalism such as the needles method as described for example in the document "Application of the needle optimization technique to the design of optical coatings" by A. V. Tikhonravov et al, Applied Optics, vol. 35, n° 28, pages 5493-5508, 1 Oct. 1996.

In the first example embodiment described above, the spacer 120 is arranged between the second semi-reflective layer 118 and the structured layer 110. In a variant, the spacer 120 may be arranged between the first semi-reflective layer 108 and the structured layer 110, with in this case a relief previously formed on the substrate 102, as described below in relation to FIGS. 11 to 18.

The etching stop layer 116 is present at least in the filters 106 that do not comprise the spacer 120. For reasons of simplification of design, the etching stop layer may be present in all the filters 106, as is the case with the example in FIG. 1. The etching stop layer 116 is arranged on or under the structured layer 110 depending on whether the spacer 120 is arranged on or under the structured layer 110.

The semi-reflective layers 108 and 118 preferably comprise at least one metal. The refractive index of a metal is complex and can be denoted n+ik. The metal forming the semi-reflective layers 108 and 118 is preferably chosen so that the ratio k/n is as high as possible, for example at least equal to approximately 10, throughout the spectral range covered by the interference filters 106, in order to obtain good transmission of order 1 wavelengths and good rejection of the wavelengths at higher orders, which is the case with silver.

In a variant, the filters 106.4 to 106.6 may comprise a plurality of spacers 120 formed by one or more materials transparent to the wavelengths intended to be transmitted by the filters 106.4-106.6.

In a variant of the first example embodiment, the device 100 may comprise, in addition to the filters 106.1 to 106.6, other filters formed from semi-reflective layers 108 and 118, of the structured layer 110, but which comprise one or more spacers such that the height, or thickness, of the Fabry-Perot cavities of these filters is different from those of the filters 106.1 to 106.6. The device 100 may comprise a plurality of groups of filters 106 each including one (or more) spacer with a different thickness and/or different material or materials. It is in particular possible for all the groups of filters (each group of filters corresponding to the filters having the same thickness) to comprise a spacer. The presence of a spacer in all the filters 106 can improve adhesion when the second semi-reflective layer 118 is deposited on these spacers, compared with a deposition of the second semi-reflective layer 118 directly on the etching stop layer 116.

Figure 2:
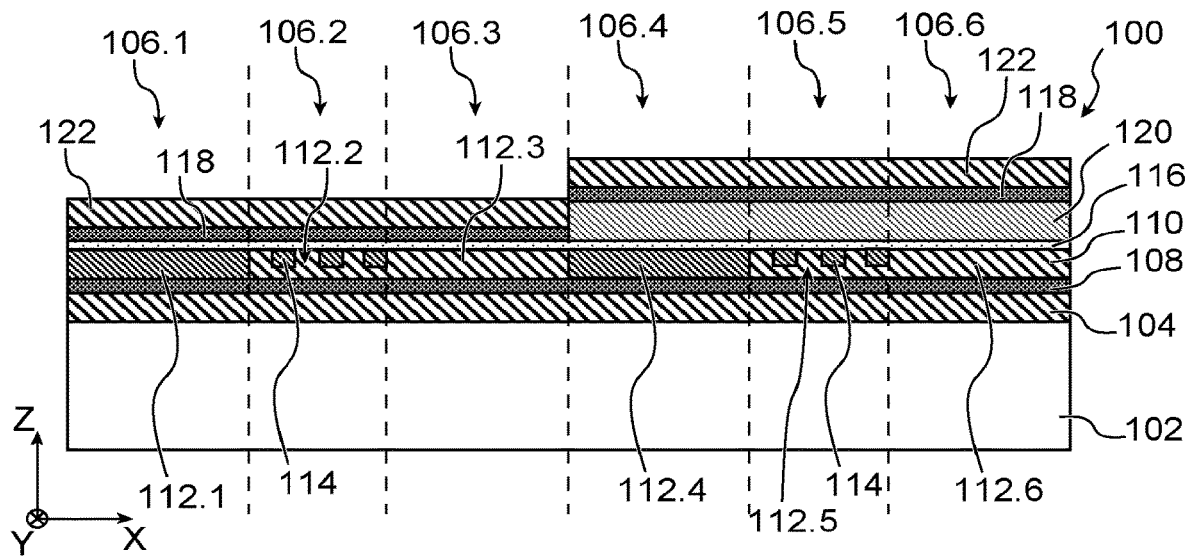

In the first example embodiment described above, the hollows 114 are produced throughout the thickness of the structured layer 110. In a second example embodiment shown in FIG. 2, the hollows 114 are produced through a part of the thickness of the structured layer 110. Thus the first material with refractive index $n_H$ is also present under the portions of the second material with refractive index $n_B$ filling the hollows 114. The fact that the hollows 114 pass through only part of the thickness of the structured layer 110 means that, in order to obtain a given effective refractive index at a region of the structured layer 110 that comprises these hollows (corresponding to the regions 112.2 and 112.5 in FIG. 2), the lateral dimensions of the hollows 114, that is to say the dimensions in the plane (X,Y), are greater than those of hollows making it possible to obtain this same effective refractive index but which would be produced throughout the thickness of the structured layer 110.

In the two example embodiments described above, in each group of filters 106, only one filter (the filter 106.2 for the group of filters not comprising the spacer 120, and the filter 106.5 for the group of filters comprising the spacer 120) comprises structurings. It is however possible for, in each group of filters, a plurality of filters, or even all the filters, to comprise structurings of different dimensions in order to obtain different spectral responses.

Figure 3:
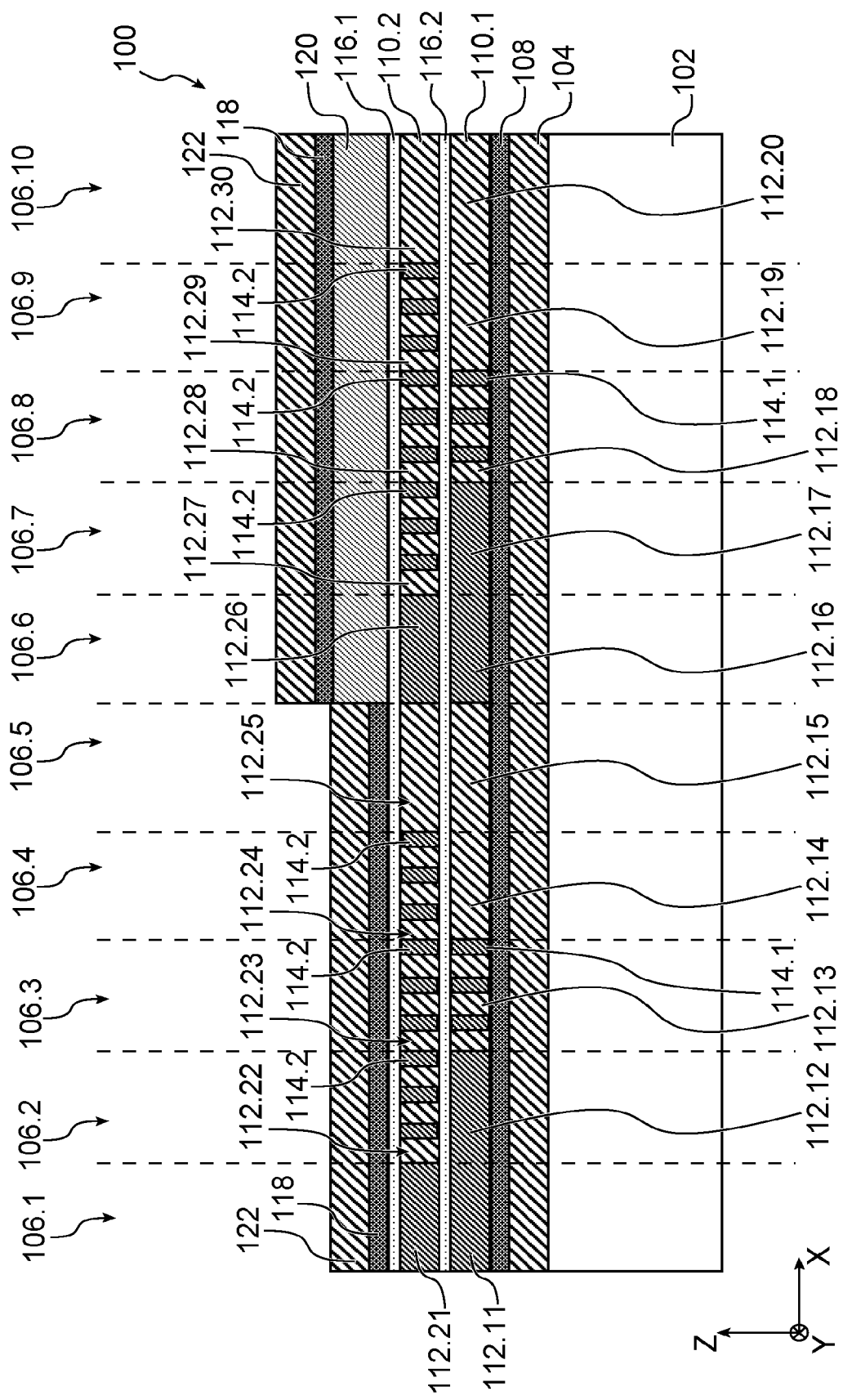
FIG. 3 shows schematically an optical filtering device that is the subject matter of the present invention, according to a first embodiment.

In the two example embodiments described above, the device 100 comprises only one structured layer 100 common to all the filters 106 and arranged between the semi-reflective layers 108 and 118 of these filters 106. FIG. 3 shows the device 100 according to a first embodiment comprising ten filters 106.1 to 106.10, each of these filters comprising, between the two semi-reflective layers 108 and 118, two parts of two structured layers 110.1 and 110.2 arranged one on the other. The filters 106.1 to 106.5 form the first group of the filters not comprising the spacer 120, and the filters 106.6 to 106.10 form the second group of filters comprising the spacer 120.

The filter 106.1 comprises regions 112.11 and 112.21 of the structured layers 110.1 and 110.2 comprising only the second material. The filter 106.2 comprises a region 112.12 of the first structured region 110.1 comprising only the second material, and a region 112.22 of the second structured layer 110.2 comprising the first material in which hollows 114.2 are produced throughout the thickness of the second structured layer 110.2 and are filled by the second material. The filter 106.3 comprises regions 112.13 and 112.23 of the structured layers 110.1 and 110.2 comprising the first material in which hollows 114.1 and 114.2 are produced and filled by the second material. The filter 106.4 comprises a region 112.14 of the first structured layer 110.1 comprising only the first material, and a region 112.24 of the second structured layer 110.2 comprising the first material in which hollows 114.2 are produced throughout the thickness of the second structured layer 110.2 and are filled by the second material. Finally, the filter 106.5 comprises regions 112.15 and 112.25 of the structured layers 110.1 and 110.2 comprising only the first material. The regions 112.16 to 112.20 and 112.26 to 112.30 of the structured layers 110.1 and 110.2 in the filters 106.6 to 106.10 are similar to those of the filters 106.1 to 106.5.

A first etching stop layer 116.1 is arranged on the second structured layer 110.2. The function of this first etching stop layer 116.1 is similar to that previously described for the etching stop layer 116.

A second etching stop layer 116.2 comprising a material which can be etched much more slowly than the first material of the second structured layer 110.2 is interposed between the structured layers 110.1 and 110.2. This second etching stop layer 116.2 makes it possible not to damage the first structured layer 110.1 when the second structured layer 110.2 is produced, particularly during the etching of the first material of the second structured layer 110.2. This second etching stop layer 116.2 comprises for example a material with a similar nature to that of the first etching stop layer 116.1, such as AlN or $TiO_2$, and which is transparent vis-à-vis the wavelengths intended to be transmitted by the filters 106. The thickness of the second etching stop layer 116.2 is for example between approximately 2 nm and 10 nm.

Thus the effective index in the regions of the structured layers 110.1 and 110.2 differ, in each group of filters, from one filter to another, which makes it possible to produce filters having different spectral responses. The combination of the regions of a plurality of superimposed structured layers therefore makes it possible to produce a large number of regions with different effective refractive indices, since the accessible lateral dimensions of the structures are limited by the technological possibilities. On the other hand, the method for producing the filtering device according to the first embodiment is more complex than for the production of a filtering device comprising only one structured layer as in the first and second example embodiments. However, this configuration of the filtering device with two superimposed structured layers facilitates the lithography carried out compared with that used during the production of a filtering device comprising the same number of filters, with similar spectral filtering ranges, but formed in a single structured layer.

As in the second example embodiment, the hollows produced in the structured layers 110.1 and 110.2 may be produced through only part of the thickness of these layers.

Figure 4:
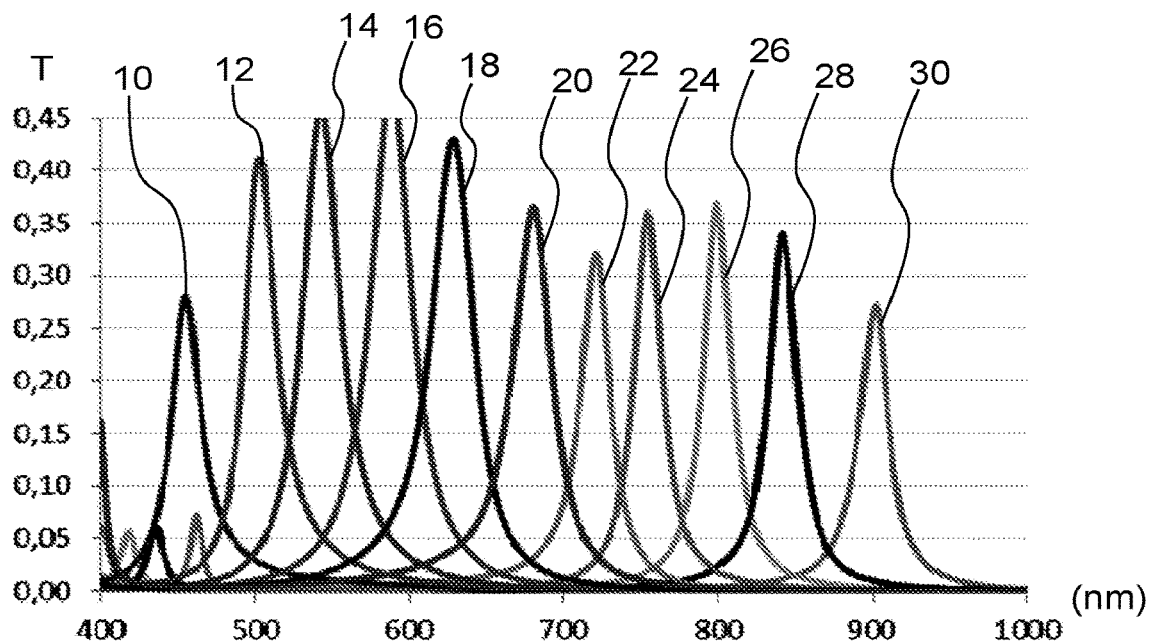
FIG. 4 shows the spectral responses of an optical filtering device according to the first example embodiment.

FIG. 4 shows spectral responses (that is to say the value of the coefficient of transmission T as a function of the wavelength, in nanometres in FIG. 4) obtained for a filtering device 100 comprising only one structured layer 110 in which the structurings are produced throughout the thickness of the structured layer 110. This filtering device comprises six filters 106 not comprising the spacer 120 and the spectral responses of which correspond to the curves referenced 10, 12, 14, 16, 18 and 20, and five filters comprising the spacer 120 and the spectral responses of which correspond to the curves referenced 22, 24, 26, 28 and 30.

The filtering device 100 for obtaining the spectral responses shown in FIG. 4 comprises the following elements:

glass substrate 102;

first anti-reflective layer 104 comprising SiN and with a thickness of 50 nm;

first semi-reflective layer 108 comprising Ag and with a thickness of 44 nm;

structured layer 110 with a thickness $e_N$ of 105 nm, the second material of which is $SiO_2$ and the first material of which is SiN, and comprising structurings, and therefore hollows 114, with a rectangular shape;

spacer 120 comprising $SiO_2$ and with a thickness $e_S$ of 80 nm;

second semi-reflective layer 118 comprising Ag and with a thickness of 50 nm;

second anti-reflective layer 122 comprising SiN and with a thickness of 42 nm.

The SiN used in this filtering device is enriched with silicon, which confers a relatively high refractive index on it, close to that of $TiO_2$, with on the other hand a certain absorption of the short wavelengths (which has no impact in the present case since the filters with a spectral response located in the blue range comprise little or no SiN).

With regard to the filters comprising the spacer 120, the second anti-reflective layer 122 is covered with a portion of amorphous silicon with a thickness for example equal to 15 nm. This portion of amorphous silicon makes it possible, with regard to the short wavelengths corresponding approximately to those of the blue colour, to attenuate "bounces" or secondary peaks of the spectral responses of the filters comprising the spacer 120 and the centre wavelengths of which are longer. These bounces are caused by the orders higher than the order 1 of the Fabry-Perot cavities of these filters. The portion of amorphous silicon is transparent in the remainder of the spectral range. This portion of amorphous silicon also makes it possible, by constructive interferences, to increase the transmission of the filters in which the portion of amorphous silicon is located.

The eleven filters of this filtering device cover a spectral band of between approximately 450 nm and 900 nm. The centre wavelengths of the spectral responses (order 1) are uniformly distributed in this spectral band, which covers the major part of the visible and near infrared spectrum. The sixth interference filters not comprising the spacer 120 and the spectral responses of which correspond to the curves referenced 10, 12, 14, 16, 18 and 20 cover a first part of this spectral band ranging from approximately 450 nm to approximately 680 nm. The five interference filters comprising the spacer 120 and the spectral responses of which correspond to the curves referenced 22, 24, 26, 28 and 30 cover a second part of this spectral band ranging from approximately 720 nm to approximately 900 nm.

The relative proportions by volume of $SiO_2$ and SiN in the regions of the structured layer 110 in these various filters are indicated in the following table. In this table, the filters are identified by the centre wavelength of their spectral response. The widths of the SiN pads in the regions of the structured layer 110, the widths of spaces between these pads and the period of these pads are also indicated in this table.

| Centre wavelength (nm) | Relative proportion $SiO_2$/SiN (%) | Spacer thickness (nm) | Width of SiN pad (nm) | Width of spaces between pads (nm) | Period (nm) |
|---|---|---|---|---|---|
| 450 | 100/0 | 0 | 0 | 0 | 0 |
| 500 | 85/15 | 0 | 135 | 215 | 350 |
| 540 | 70/30 | 0 | 195 | 155 | 350 |
| 580 | 50/50 | 0 | 250 | 100 | 350 |
| 630 | 30/70 | 0 | 290 | 60 | 350 |
| 680 | 0/100 | 0 | 0 | 0 | 0 |
| 720 | 85/15 | 80 | 135 | 215 | 350 |
| 750 | 70/30 | 80 | 195 | 155 | 350 |
| 800 | 50/50 | 80 | 250 | 100 | 350 |
| 840 | 30/70 | 80 | 290 | 60 | 350 |
| 900 | 0/100 | 80 | 0 | 0 | 0 |

FIGS. 5 to 10 show steps of a method for producing the device 100 previously described in relation to FIG. 1.

Figure 5:
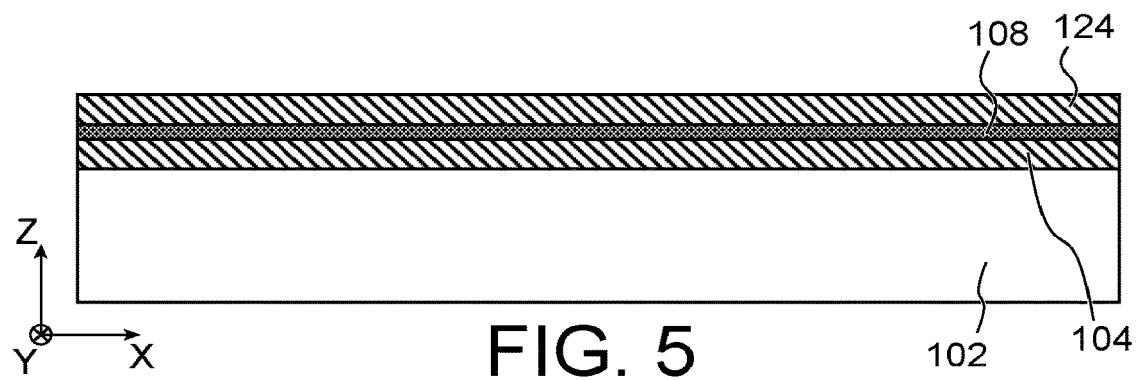
FIGS. 5 to 10 show schematically steps of a method for producing an optical filtering device according to the first example embodiment.

The first anti-reflective layer 104 is first of all deposited on the substrate 102, and then the first semi-reflective layer 108 is deposited on the first anti-reflective layer 104. A layer 124 comprising the first material and with a thickness equal to the thickness $e_N$ of the structured layer 110 intended to be produced is next deposited on the first semi-reflective layer 108 (FIG. 5). Advantageously, prior to the deposition of the layer 124, the first semi-reflective layer 108 can be encapsulated by a fine protective layer (not shown in the figures) in order to prevent degradation of the metal of the first semi-reflective layer 108 by air or by the etching of the layer 124 carried out subsequently.

Figure 6:
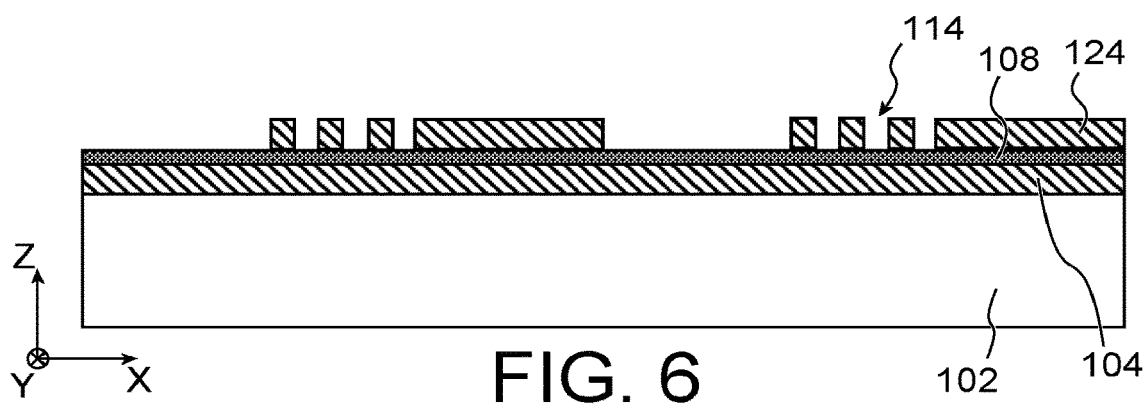

Steps of lithography and etching of the layer 124 are next implemented in order to form the hollows 114 at the regions of the structured layer intended to comprise structurings, and thus eliminate the parts of the layer 124 located at the regions of the structured layer 110 intended not to comprise the first material (FIG. 6). When these hollows 114 pass through the entire thickness of the layer 124, as is the case in the example described here, the first semi-reflective layer 108 serves as an etching stop layer when the hollows 114 are etched.

Figure 7:
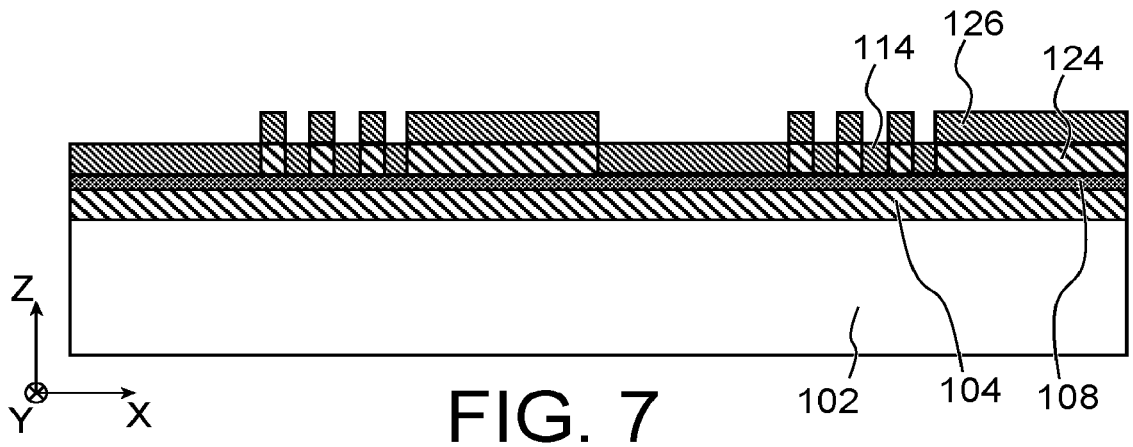
Figure 8:
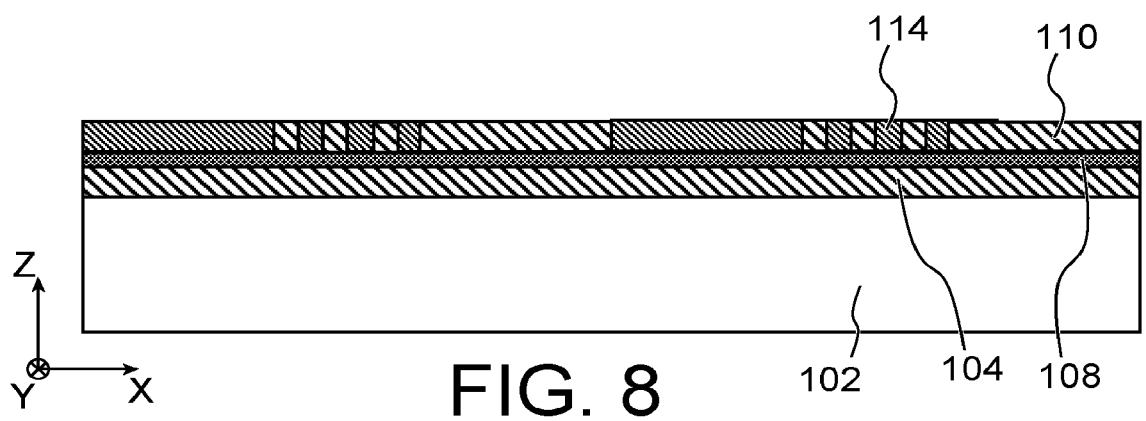

As shown in FIG. 7, a layer 126 comprising the second material and with a thickness at least equal to the thickness $e_N$ of the structured layer 110, and generally equal to two or three times the thickness $e_N$ in order to facilitate the implementation of the following polishing, is next deposited on the previously produced structure, in the etched parts of the layer 124 (that is to say in the hollows 114 and at the regions of the structured layer 110 intended to comprise only the second material). Parts of the layer 126 are also deposited on the remaining parts of the layer 124.

Chemical mechanical polishing (CMP) is next carried out with stoppage on the remaining portions of the layer 124, thus eliminating the parts of the layer 126 deposited on the remaining parts of the layer 124 (FIG. 8), and forming the structured layer 110.

Figure 9:
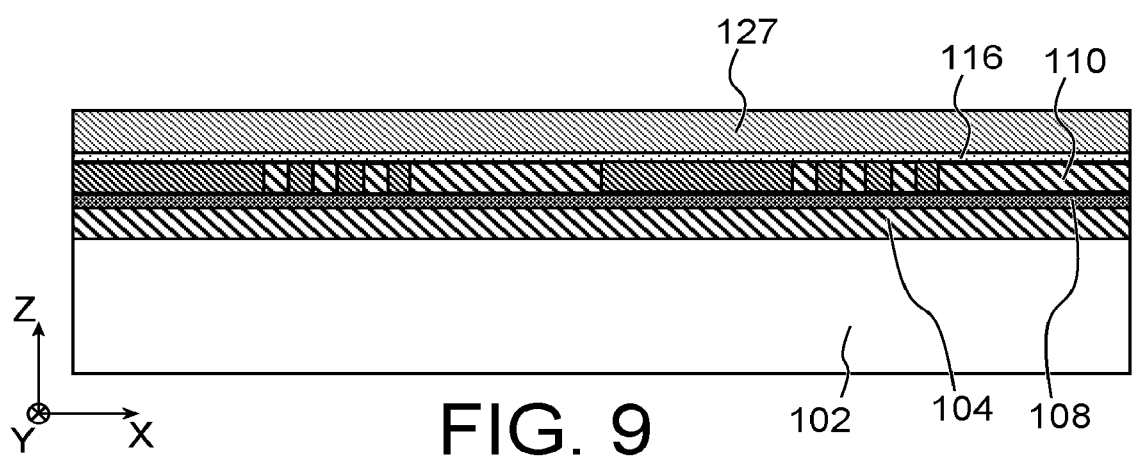

As shown in FIG. 9, the etching stop layer 116 is next deposited on the structured layer 110, and then a layer 127 comprising the material of the spacer 120 and with a thickness $e_S$ is deposited on the etching stop layer 116.

Figure 10:
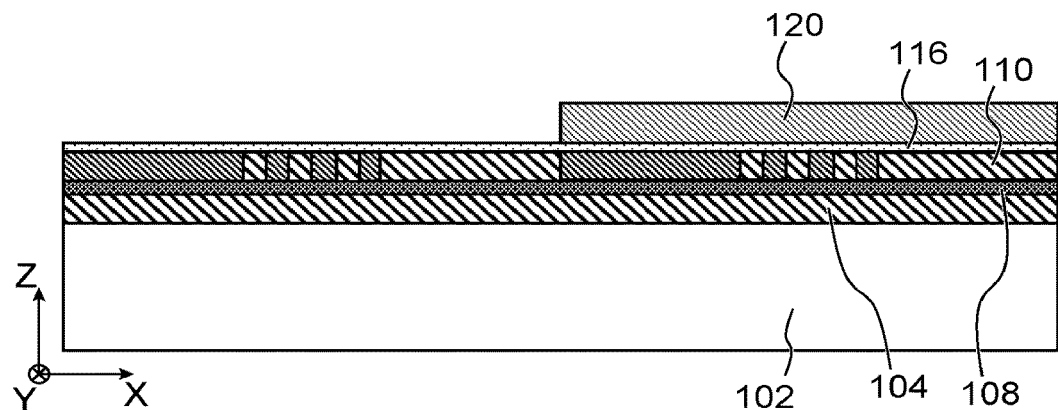

Steps of lithography and etching of the layer 127 are next implemented so that a remaining portion of the layer 127 forms the space 120 (FIG. 10). The presence of the etching stop layer 116 at the etched part or parts of the layer 127 prevents over-etching in the structured layer 110 during the etching of the layer 127.

The second semi-reflective layer 118 is next deposited on the whole of the structure, that is to say on the spacer 120 and on the part or parts of the etching stop layer 116 not covered by the spacer 120. A fine adhesion layer (not shown) may be deposited on the whole of the structure, prior to the deposition of the second semi-reflective layer 118. The second anti-reflective layer 122 is next deposited on the second semi-reflective layer 118. The device obtained corresponds to the device 100 shown in FIG. 1.

Figure 11:
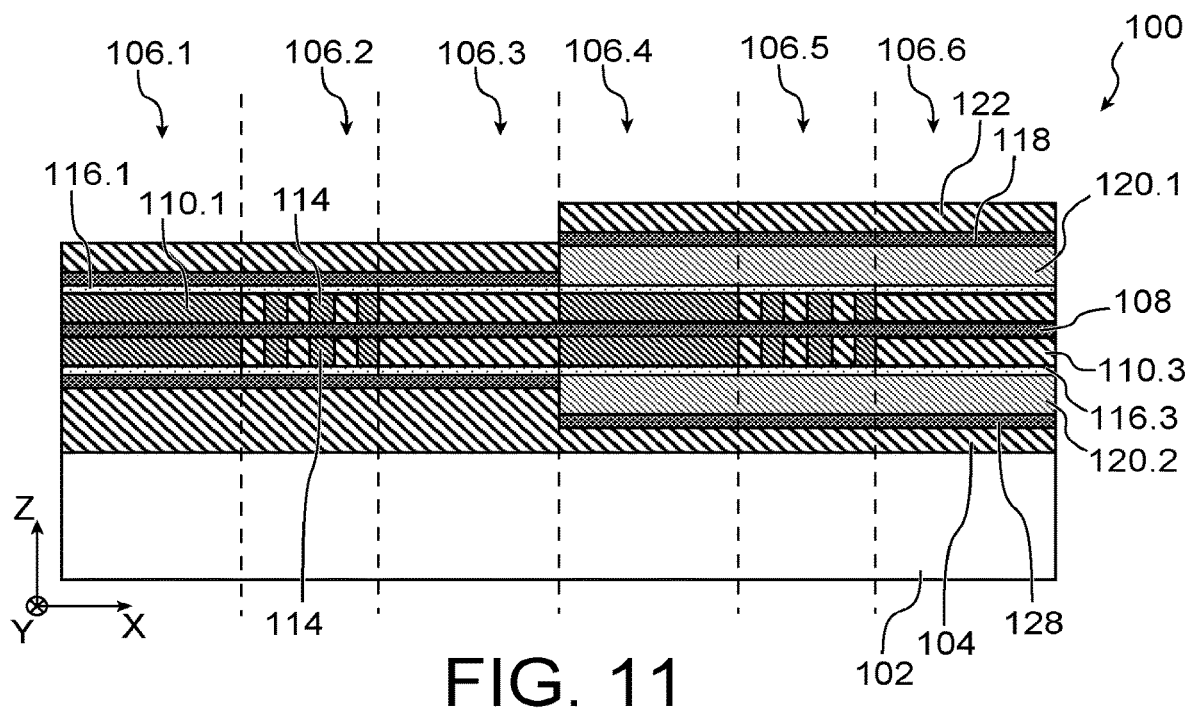
FIG. 11 shows schematically an optical filtering device that is the subject matter of the present invention, according to a second embodiment.

FIG. 11 shows the filtering device 100 according to a second embodiment in which each interference filter 106.1-106.6 comprises two Fabry-Perot cavities placed one above the other.

The device 100 comprises the first anti-reflective layer 104 arranged on the substrate 102. The thickness of the part of the first anti-reflective layer 104 formed in the first group of filters 106.1-106.3 not comprising a spacer is greater than that of the part of the first anti-reflective layer 104 formed at the second group of filters 106.4-106.6. A third semi-reflective layer 128 is arranged on the first anti-reflective layer 104. At the second group of filters 106.4-106.6, a second spacer 120.2 is produced on the third semi-reflective layer 128. The first anti-reflective layer 104 thus forms, at a first region of the substrate 102 on which the first group of filters 106.1-106.3 is intended to be produced, a relief, the thickness of which is substantially equal to that of the second spacer 120.2. The sum of the thicknesses of the third semi-reflective layer 128 and of the part of the first anti-reflective layer 104 in the first group of filters 106.1-106.3 is therefore substantially equal to that of the thicknesses of the second spacer 120.2, of the third semi-reflective layer 128 and of the part of the first anti-reflective layer 104 in the second group of filters 106.4-106.6. In a variant, this relief could be produced by hollowing out the substrate 102, the first anti-reflective layer 104 being in this case able to have a constant thickness.

A top face of the third semi-reflective layer 128 in the first group of filters 106.1-106.3 and a top face of the second spacer 120.2 form a planar surface on which another etching stop layer 116.3 is arranged, referred to as the third etching stop layer in order to distinguish it from the second etching stop layer 116.2 previously described in relation to FIG. 3, the role of which is to protect the second spacer 120.2.

The device 100 comprises another structured layer 110.3, referred to as the third structured layer in order to distinguish it from the second structured layer 110.2 previously described in relation to FIG. 3, common to all the filters 106.1-106.6. The third structured layer 110.3 comprises the two materials with different refractive indices and, in some regions, structurings similar to those previously described in relation to FIG. 1. The third structured layer 110.3 is here similar to the structured layer 110 previously described in relation to FIG. 1.

The first semi-reflective layer 108, comprising for example a material similar to that of the third semi-reflective layer 128, is arranged on the third structured layer 110.3. Thus, for each of the filters 106.1-106.6, a second Fabry-Perot cavity is formed between the two semi-reflective layers 108 and 128. First Fabry-Perot cavities, similar to those of the device 100 previously described in relation to FIG. 1, are next produced on the second Fabry-Perot cavities.

The first structured layer 110.1 common to all the filters 106.1-106.6 is arranged on the first semi-reflective layer 108. The first structured layer 110.1 is similar to the third structure layer 110.3.

The first etching stop layer 116.1 is arranged on the first structured layer 110.1.

The first spacer 120.1, for example similar to the second spacer 120.2, is arranged on the first etching stop layer 116.1 at the second group of filters 106.4-106.6. The second semi-reflective layer 118 is arranged on the first spacer 120.1 and, in the first group of filters 106.1-106.3, on the first etching stop layer 116.1.

The second anti-reflective layer 122, for example similar to the one previously described in relation to FIG. 1, is arranged on the second semi-reflective layer 118. In each of the filters 106.1-106.6, the two Fabry-Perot cavities formed may be similar with respect to one another.

Compared with the interference filters of the device 100 according to the first example embodiment, those of the device 100 according to the second embodiment have better rejection and better selectivity.

Because the production of each of the structured layers 110.1 and 110.3 requires the implementation of a planarisation step, for example by CMP, each structured layer 110.1 and 110.3 is produced on a planar face (the top face of the third etching stop layer 116.3 for the third structured layer 110.3 and the top face of the first semi-reflective layer 108 for the first structured layer 110.1). For this purpose, the second spacer 120.2 is arranged under the third structured layer 110.3. Thus, after the production of the second Fabry-Perot cavities of the filters 106.1-106.6, the surface on which the first Fabry-Perot cavities of the filters 106.0-106.6 are produced is planar.

Figure 12:
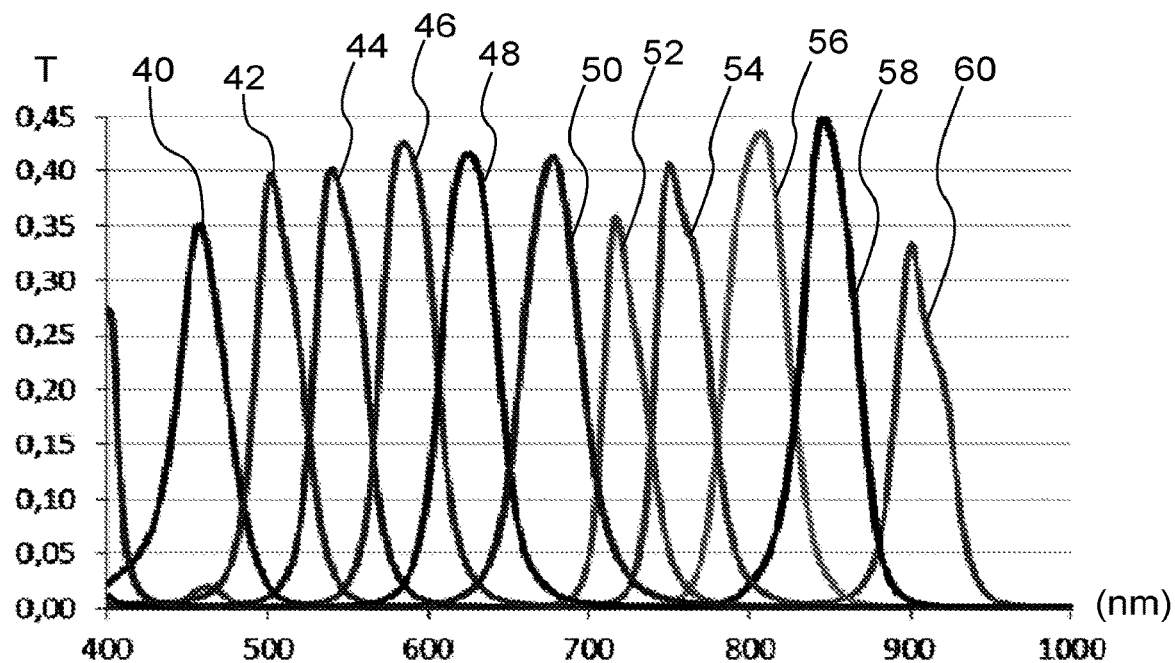
FIG. 12 shows the spectral responses of an optical filtering device that is the subject matter of the present invention, according to the second embodiment.

FIG. 12 shows the spectral responses obtained for a filtering device similar to the one described in relation to FIG. 11, that is to say comprising two structured layers 110.1 and 110.3 in which the structurings are produced throughout the thickness and forming, for each filter, two Fabry-Perot cavities placed one above the other. This filtering device comprises six interference filters not comprising the spacers 120.1 and 120.2 and the spectral responses of which correspond to the curves referenced 40, 42, 44, 46, 48 and 50, and five interference filters comprising the spacers 120.1 and 120.2 and the spectral responses of which correspond to the curves referenced 52, 54, 56, 58 and 60.

The filtering device 100 making it possible to obtain the spectral responses shown in FIG. 12 comprises the following elements:
  glass substrate 102;
  first anti-reflective layer 104 comprising SiN and with a thickness of 20 nm in the five filters comprising the spacers, and a thickness of 100 nm in the six filters not comprising the spacers;
  third semi-reflective layer 129 comprising Ag and with a thickness of 27 nm;
  second spacer 120.2 comprising $SiO_2$ and with a thickness of 80 nm;
  third structured layer 110.3 with a thickness $e_N$ of 105 nm, the second material of which is $SiO_2$ and the first material of which is SiN, and comprising rectangular-shaped hollows 114;
  first semi-reflective layer 108 comprising Ag and with a thickness of 61 nm;
  first structured layer 110.1 with a thickness $e_N$ of 105 nm, the second material of which is $SiO_2$ and the first material of which is SiN, and comprising rectangular-shaped hollows 114;
  first spacer 120.1 comprising $SiO_2$ and with a thickness $e_S$ of 80 nm;
  second semi-reflective layer 118 comprising Ag and with a thickness of 27 nm;
  second anti-reflective layer 122 comprising SiN and with a thickness of 67 nm.

As in the example embodiment previously described, the SiN used in this filtering device is enriched with silicon and, in the filters comprising the spacers 120.1 and 120.2, the second anti-reflective layer 122 is covered with a portion of amorphous silicon with a thickness of 120 nm. Furthermore, the first anti-reflective layer 104 is suited to the optical impedance of all the filters 106.1-106.6 at the wavelength of interest of each of these filters.

The eleven filters of this filtering device cover a spectral band between approximately 450 nm and 900 nm. The centre wavelengths of the spectral responses (first order) are uniformly distributed in this spectral band, which covers the major part of the visible spectrum and near infrared. The six interference filters not comprising the spacers 120.1 and 120.2 and the spectral responses of which correspond to the curves referenced 40, 42, 44, 46, 48 and 50 cover a first part of this spectral band ranging from approximately 450 nm to approximately 680 nm. The five interference filters comprising the spacers 120.1 and 120.2 and the spectral responses of which correspond to the curves referenced 52, 54, 56, 58 and 60 cover a second part of this spectrum band ranging from approximately 720 nm to approximately 900 nm. Compared with the spectral responses shown in FIG. 4, those shown in FIG. 12 have maximum amplitudes that are more homogeneous with respect to one another, by virtue of the superimposition of the two Fabry-Perot cavities in each of the filters 106.

FIGS. 13 to 17 show steps of a method for producing the filtering device 100 previously described in relation to FIG. 11.

Figure 13:
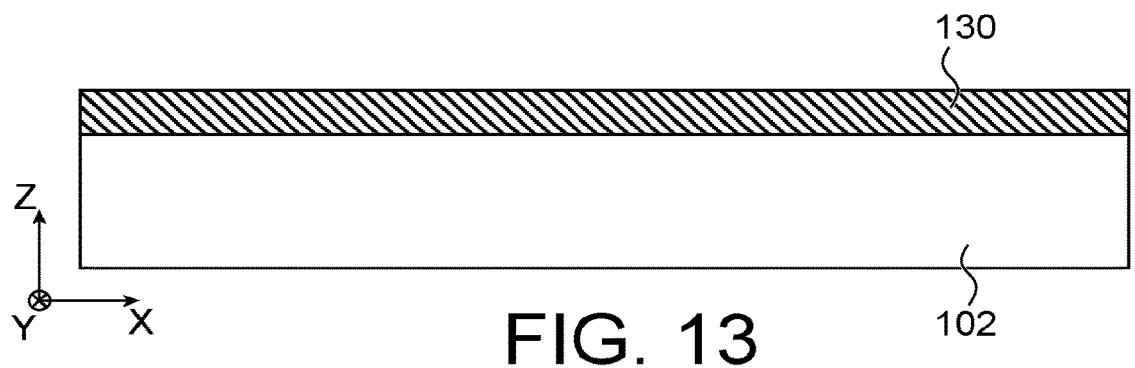
FIGS. 13 to 17 show schematically steps of a method for producing an optical filtering device that is the subject matter of the present invention, according to the second embodiment.

A first layer 130, from which the first anti-reflective layer 104 is intended to be produced, is deposited on the substrate 102 (FIG. 13). The thickness of this first layer 130 is equal to the thickness of the second spacer 120.2 intended to be produced.

Figure 14:
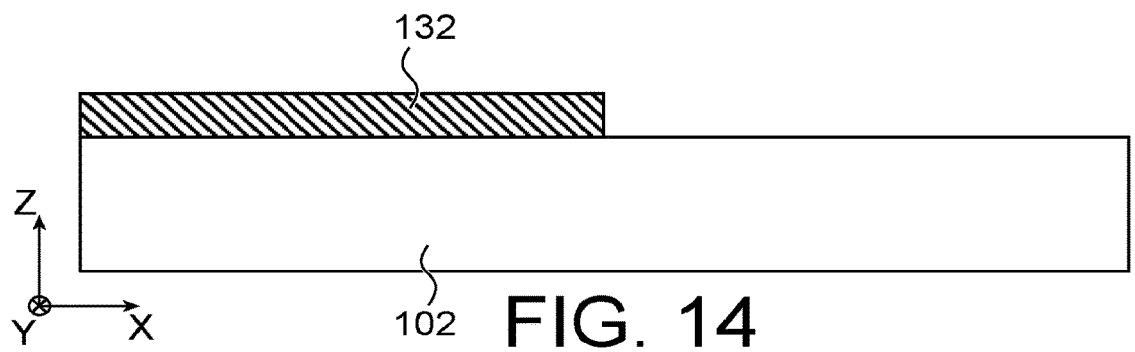

As shown in FIG. 14, lithography and etching of this first layer 130 are next implemented in the first layer 130 so that a remaining portion 132 of the first layer 130 is intended to form a part of the first anti-reflective layer 104 located in the filters 106.1-106.3 not comprising spacers.

The first anti-reflective layer 104 is next completed by depositing a material similar to that of the first layer 130 both on the remaining portion 132 of the first layer 130 and on the part of the substrate 102 not covered by the remaining portion 132, with a thickness equal to that of the part of the first anti-reflective layer 104 intended to be located at the filters intended to comprise the spacers 120.1 and 120.2.

Figure 15:
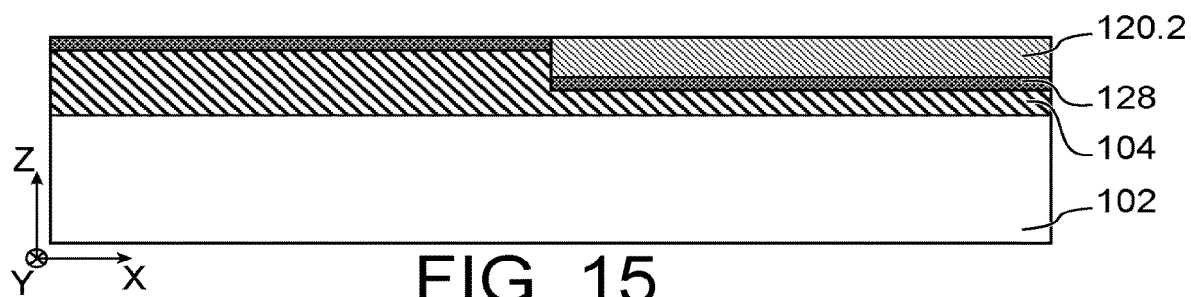

The third semi-reflective layer 128 is next deposited on the first anti-reflective layer 104. A layer intended to form the second spacer 120.2, that is to say comprising the material of this second spacer 120.2 and the thickness of which is at least equal to that of the second spacer 120.2, is next deposited on the third semi-reflective layer 128. A planarisation of the CMP type is next implemented with stoppage on the part of the third semi-reflective layer 128 (or of a fine protective layer, not shown) located on the part of the first anti-reflective layer 104 with the greatest thickness. The remaining portion of this layer forms the second spacer 120.2 (FIG. 15). The second spacer 120.2 and the part of the third semi-reflective layer 128 intended to form part of the second Fabry-Perot cavity of the first interference filters 106.1-106.3 form a planar top surface.

Figure 16:
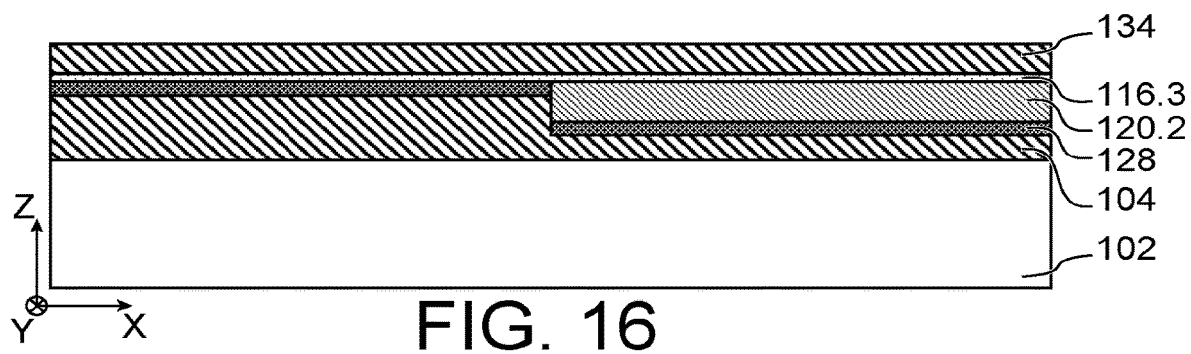

As shown in FIG. 16, the third etching stop layer 116.3 is next deposited on the structure previously produced, that is to say on the planar surface formed by the second spacer 120.2 and the part of the third semi-reflective layer 128 located on the part of the first anti-reflective layer 104 with the greatest thickness.

A layer 134 comprising the first material and with a thickness equal to the thickness $e_N$ of the third structured layer 110.3 intended to be produced is next deposited on the third etching stop layer 116.3.

Steps of lithography and etching of the layer 134 are next implemented in order to form the hollows 114, that is to say to eliminate the parts of the layer 134 located at the regions of the third structured layer 110.3 intended not to comprise the first material. A layer comprising the second material and with a thickness at least equal to the thickness $e_N$ of the third structured layer 110.3 is next deposited on the previously produced structure, in the etched parts of the layer 134 (that is to say in the hollows 114 and at the regions of the third structured layer 110.3 intended to comprise only the second material). Parts of this layer are also deposited on the remaining parts of the layer 134.

Figure 17:
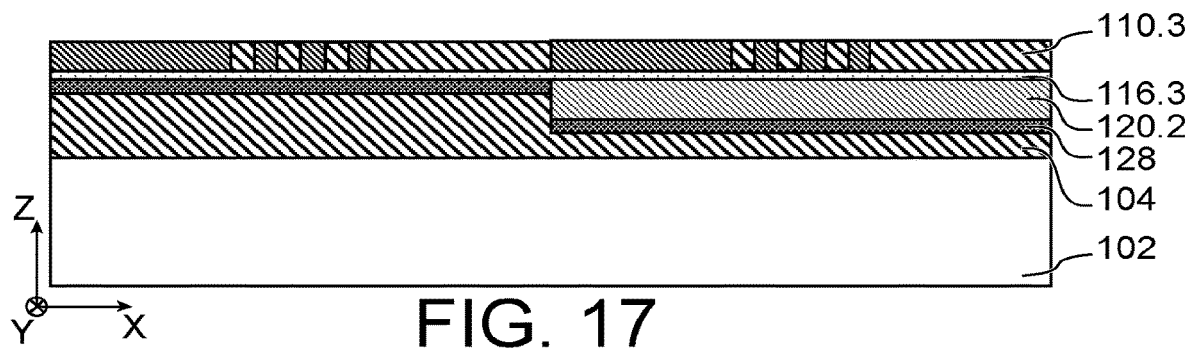

A chemical mechanical polishing (CMP) is next carried out with stoppage on the remaining portions of the layer 134, thus eliminating the parts of the layer deposited on the remaining parts of the layer 134 and forming the third structured layer 110.3 (FIG. 17).

The first semi-reflective layer 108 is next deposited on the third structured layer 110.3, and then the first structured layer 110.1 is next produced by implementing steps similar to those producing the third structured layer 110.3. The device 100 is next completed by the implementation of steps similar to those previously described for producing the device 100 according to the first example embodiment.

In the implementations and example embodiments described above, the materials of the structured layers 110, 110.1 and 110.2 and of the spacers 120, 120.1 and 120.2 are dielectric materials. In a variant, one or more of these materials may be semiconductor materials, for example amorphous or polycrystalline silicon, ZnO, ZnS, ZnSe or ZnTe.

Figure 18:
FIG. 18 shows schematically an image sensor, also the subject matter of the present invention, according to a particular embodiment.

FIG. 18 shows schematically an image sensor 1000 according to a particular embodiment.

The image sensor 1000 comprises an electronic part 1002, formed for example by detection elements of the CMOS type forming pixels 1004. The filtering device 100 is integrated on the front face of this electronic part 1002, so that the filters 106 are arranged opposite the pixels 1004. It is possible for each filter 106 to be arranged opposite a pixel 1004, or opposite a plurality of adjacent pixels. The image sensor 1000 may be a hyperspectral camera, and may comprise other elements, for example optical and electronic, such as electrical interconnections and microlenses, not shown in FIG. 18.

The invention claimed is:
1. An optical filtering device, comprising:
at least first and second interference filters each including at least one first Fabry-Perot cavity formed by first and second semi-reflective layers between which at least one first structured layer is arranged, wherein
the first structured layer belongs conjointly to the first and second interference filters, has a substantially constant thickness, is substantially planar and comprises first portions of at least two dielectric or semiconductor materials, with different refractive indices, arranged, in at least one of the first Fabry-Perot cavities and in a plane parallel to the first semi-reflective layer, alongside one another in alternation,
the first Fabry-Perot cavity of the second interference filter comprises at least one first spacer arranged between one of the first and second semi-reflective layers and the first structured layer in such a way that a distance between the first and second semi-reflective layers of the first Fabry-Perot cavity of the second interference filter is greater than a distance between the first and second semi-reflective layers of the first Fabry-Perot cavity of the first interference filter, the first and second interference filters are produced such that:

the first and second interference filters each comprise at least one second Fabry-Perot cavity placed on top of the first Fabry-Perot cavity and formed by the first and a third semi-reflective layer between which at least one second structured layer is arranged, the second structured layer belonging conjointly to the first and second interference filters, having a substantially constant thickness, being substantially planar and comprising second portions of the two materials with different refractive indices arranged, in at least one of the second Fabry-Perot cavities and in the plane parallel to the first semi-reflective layer, alongside one another in alternation, the second Fabry-Perot cavity of the second interference filter further comprising at least one second spacer arranged between the third semi-reflective layer and the second structured layer so that a distance between the first and third semi-reflective layers of the second Fabry-Perot cavity of the second interference filter is greater than a distance between the first and third semi-reflective layers of the second Fabry-Perot cavity of the first interference filter, and the optical filtering device comprises a plurality of said first interference filters arranged alongside one another and wherein proportions by volume of the two materials with different refractive indices with respect to each other, in at least one of the first structured layer and the second structured layer, are different from one first interference filter to the other, or comprises a plurality of said second interference filters arranged alongside one another and wherein proportions by volume of the two materials with different refractive indices with respect to each other in at least one of the first structured layer and the second structured layer, are different from one second interference filter to the other.

2. The optical filtering device according to claim 1, wherein at least one of the first structured layer and the second structured layer comprises periodic patterns formed respectively by at least one of the first and second portions of a second of the two materials with different refractive indices arranged in a layer of a first of the two materials with different refractive indices formed respectively from at least one of the first and second portions of the first of the two materials with different refractive indices.

3. The optical filtering device according to claim 2, wherein, in at least one of the first and second Fabry-Perot cavities, values of dimensions and of a period of the periodic patterns are less than a value of a center wavelength of a spectral response respectively of said at least one of the first and second Fabry-Perot cavities at first order.

4. The optical filtering device according to claim 2, wherein said at least one of the first and second portions of the second of the two materials with different refractive indices are formed throughout the thickness respectively of said at least one of the first structured layer and the second structured layer.

5. The optical filtering device according to claim 1, further comprising:

at least one first etching stop layer arranged at least between one of the first and second semi-reflective layers and the first structured layer in the first Fabry-Perot cavity of the first interference filter.

6. The optical filtering device according to claim 1, wherein the first spacer and the first etching stop layer are arranged between the first structured layer and the second semi-reflective layer, a second etching stop layer is arranged between the second structured layer and the third semi-reflective layer.

7. The optical filtering device according to claim 1, further comprising:

at least one portion of material absorbent vis-à-vis wavelengths with values less than that of a center wavelength of a spectral response of the first Fabry-Perot cavity of the second interference filter, arranged on or in the first Fabry-Perot cavity of the second interference filter.

8. An image sensor comprising at least one optical filtering device according to claim 1, wherein each of the first and second interference filters of the optical filtering device is arranged at one or more adjacent pixels of the image sensor.

9. An optical filtering device, comprising:

at least first and second interference filters each comprising at least one first Fabry-Perot cavity formed by first and second semi-reflective layers between which at least one first structured layer is arranged, wherein the first structured layer belongs conjointly to the first and second interference filters, has a substantially constant thickness, is substantially planar and comprises first portions of at least two dielectric or semiconductor materials, with different refractive indices, arranged, in each of the first Fabry-Perot cavities and in a plane parallel to the first semi-reflective layer, alongside one another in alternation, the first Fabry-Perot cavity of the second interference filter comprises at least one first spacer arranged between one of the first and second semi-reflective layers and the first structured layer in such a way that a distance between the first and second semi-reflective layers of the first Fabry-Perot cavity of the second interference filter is greater than a distance between the first and second semi-reflective layers of the first Fabry-Perot cavity of the first interference filter, and the first and second interference filters are produced such that:

the first and second interference filters each comprise at least one second Fabry-Perot cavity placed on top of the first Fabry-Perot cavity and formed by the first and a third semi-reflective layer between which at least one second structured layer is arranged, the second structured layer belonging conjointly to the first and second interference filters, having a substantially constant thickness, being substantially planar and comprising second portions of the two materials with different refractive indices arranged, in each of the second Fabry-Perot cavities and in the plane parallel to the first semi-reflective layer, alongside one another in alternation, the second Fabry-Perot cavity of the second interference filter further comprising at least one second spacer arranged between the third semi-reflective layer and the second structured layer so that a distance between the first and third semi-reflective layers of the second Fabry-Perot cavity of the second interference filter is greater than a distance between the first and third semi-reflective layers of the second Fabry-Perot cavity of the first interference filter, and the second structured layer is arranged above the first structured layer.

10. A method for producing an optical filtering device comprising at least first and second interference filters each comprising at least one first Fabry-Perot cavity, the method comprising:
producing a first semi-reflective layer of the first Fabry-Perot cavities;
producing, on the first semi-reflective layer, a first structured layer belonging conjointly to the first and second interference filters, having a substantially constant thickness, being substantially planar and comprising first portions of at least two dielectric or semiconductor materials, with different refractive indices, intended to be arranged, in at least one of the first Fabry-Perot cavities and in a plane parallel to the first semi-reflective layer, alongside one another in alternation;
producing at least one first spacer at a region of the first structured layer intended to form part of the first Fabry-Perot cavity of the second interference filter; and
producing a second semi-reflective layer of the first Fabry-Perot cavities, wherein
a distance between the first and second semi-reflective layers of the first Fabry-Perot cavity of the second interference filter being greater than a distance between the first and second semi-reflective layers of the first Fabry-Perot cavity of the first interference filter,
the first and second interference filters are produced so that:
the method further comprises, before the first semi-reflective layer is produced, the production of at least one second Fabry-Perot cavity of each of the first and second interference filters, superimposed on the first Fabry-Perot cavity and formed by the first and a third semi-reflective layers between at least one second structured layer is produced, the second structured layer belonging conjointly to the first and second inference filters, having a substantially constant thickness, being substantially planar and comprising second portions of the two materials with different refractive indices arranged, in at least one of the second Fabry-Perot cavities and in the plane parallel to the first semi-reflective layer, alongside one another in alternation, the second Fabry-Perot cavity of the second interference filter further comprising at least one second spacer arranged between the third semi-reflective layer and the second structured layer so that a distance between the first and third semi-reflective layers of the second Fabry-Perot cavity of the second interference filter is greater than a distance between the first and third semi-reflective layers of the second Fabry-Perot cavity of the first interference filter, and
a plurality of said first interference filters are made alongside one another and wherein proportions by volume of the two materials with different refractive indices with respect to each other, in at least one of the first structured layer and the second structured layer, are different from one first interference filter to the other, or wherein a plurality of said second interference filters are made alongside one another and wherein proportions by volume of the two materials with different refractive indices with respect to each other in at least one of the first structured layer and the second structured layer, are different from one second interference filter to the other.

11. The method according to claim 10, wherein the production of the first structured layer comprises:
depositing, on the first semi-reflective layer, of a layer of a first of the two materials with different refractive indices;
lithography and etching of hollows in the layer of the first of the two materials with different refractive indices, forming the first portions of the first of the two materials with different refractive indices;
depositing a layer of a second of the two materials with different refractive indices in the hollows and on the layer of the first of the two materials with different refractive indices; and
planarization of the layer of the second of the two materials with different refractive indices with stoppage on the layer of the first of the two materials with different refractive indices, forming the first portions of the second of the two materials with different refractive indices.

12. The method according to claim 10, wherein the production of the first spacer comprises:
depositing a first etching stop layer on the first structured layer
depositing, on the first etching stop layer, a layer of material intended to form the first spacer; and
lithography and etching of the layer of material intended to form the first spacer so that a remaining portion of said layer of material forms the first spacer.

13. The method according to claim 10, wherein the production of the second Fabry-Perot cavities comprises:
producing, at a first region of a substrate on which the first interference filter is intended to be produced, a relief, the thickness of which is substantially equal to that of the second spacer intended to be produced;
depositing the third semi-reflective layer on the relief and on a second region of the substrate on which the second interference filter is intended to be produced;
producing the second spacer on a part of the third semi-reflective layer intended to form part of the second Fabry-Perot cavity of the second interference filter, the second spacer and a part of the third semi-reflective layer intended to form part of the second Fabry-Perot cavity of the first interference filter forming a planar top surface; and
producing, on said planar top surface, the second structured layer, wherein
the first semi-reflective layer may next be produced on the second structured layer.

* * * * *